US012621457B2

(12) United States Patent
Bond et al.

(10) Patent No.: US 12,621,457 B2
(45) Date of Patent: May 5, 2026

(54) DATA COMPRESSION AND PACKING

(71) Applicant: Imagination Technologies Limited, Kings Langley (GB)

(72) Inventors: Jeffery Thomas Bond, Hertfordshire (GB); Gregory Alan Clark, Hertfordshire (GB); Selina Hopton, Hertfordshire (GB); Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 1076 days.

(21) Appl. No.: 17/539,391

(22) Filed: Dec. 1, 2021

(65) Prior Publication Data

US 2022/0256164 A1 Aug. 11, 2022

(30) Foreign Application Priority Data

Dec. 1, 2020 (GB) .................................... 2018944.5

(51) Int. Cl.
| | |
|---|---|
| *H04N 19/136* | (2014.01) |
| *H04N 19/119* | (2014.01) |
| *H04N 19/176* | (2014.01) |
| *H04N 19/42* | (2014.01) |

(52) U.S. Cl.
CPC ......... *H04N 19/136* (2014.11); *H04N 19/119* (2014.11); *H04N 19/176* (2014.11); *H04N 19/42* (2014.11)

(58) Field of Classification Search
CPC .. H04N 19/136; H04N 19/119; H04N 19/176; H04N 19/42; H04N 19/105; H04N 19/129; H04N 19/14; H04N 19/182; H04N 19/186; H04N 19/593; H04N 19/70; H04N 19/88; H04N 19/174; H04N 19/103
See application file for complete search history.

(56) References Cited

U.S. PATENT DOCUMENTS

| | | | |
|---|---|---|---|
| 8,824,814 B2 | 9/2014 | Lee et al. | |
| 10,819,367 B2 | 10/2020 | Fenney et al. | |
| 11,044,466 B2 * | 6/2021 | Jun ...................... | H04N 19/182 |
| 11,202,101 B2 * | 12/2021 | Chao .................... | H04N 19/119 |
| 11,481,929 B2 * | 10/2022 | Chang ................... | H04N 19/12 |
| 2010/0020880 A1 * | 1/2010 | Susnow .............. | H04N 19/182 375/E7.123 |
| 2011/0002553 A1 | 1/2011 | Nishikawa et al. | |

(Continued)

FOREIGN PATENT DOCUMENTS

| | | | | |
|---|---|---|---|---|
| EP | 2725809 A2 | 4/2014 | | |
| EP | 4009639 A1 * | 6/2022 | ............. | H04N 19/42 |

(Continued)

OTHER PUBLICATIONS

Palaz, O. "RlmCom: Raster-order Image Compressor for Embedded Video Applications" J Sign Process Syst (2017) 88:149-165 (pp. 1-17) (Year: 2017).*

*Primary Examiner* — Mia M Thomas
(74) *Attorney, Agent, or Firm* — Potomac Law Group, PLLC; Vincent M DeLuca

(57) ABSTRACT

Input pixel data having first, second and third channel data for each pixel of a block of data is received in raster scan order and is compressed in raster scan order using a block-based encoding scheme. The compressed pixel data is then output in raster scan order.

19 Claims, 12 Drawing Sheets

BLOCK OF
COMPRESSED
IMAGE DATA

↓ 602

DETERMINE NUMBER OF BITS OF COMPRESSED DATA CORRESPONDS TO ONE ROW OF PIXELS

↓ 604

IDENTIFY THE DECODING SCHEME FOR EACH GROUP OF PIXELS IN THE ROW

↓ 606

DECODE THE PIXELS USING THE IDENTIFIED DECODING SCHEME

↓

BLOCK OF
UNCOMPRESSED
IMAGE DATA

(56)        References Cited

U.S. PATENT DOCUMENTS

| | | | |
|---|---|---|---|
| 2012/0183074 A1 | 7/2012 | Fuldseth | |
| 2015/0172683 A1* | 6/2015 | Macinnis | G06T 9/00 |
| | | | 382/238 |
| 2015/0296214 A1* | 10/2015 | Mahfoodh | H04N 19/44 |
| | | | 382/233 |
| 2016/0007037 A1* | 1/2016 | Zhao | H04N 19/17 |
| | | | 382/233 |
| 2016/0127746 A1* | 5/2016 | Maurer | H04N 19/146 |
| | | | 382/246 |
| 2017/0295378 A1 | 10/2017 | Que et al. | |
| 2018/0167627 A1* | 6/2018 | McGowan | H04N 19/423 |
| 2019/0238832 A1* | 8/2019 | Jun | H04N 19/103 |
| 2020/0007151 A1* | 1/2020 | Fenney | H04N 19/182 |
| 2020/0007152 A1 | 1/2020 | Fenney et al. | |
| 2020/0007866 A1* | 1/2020 | Martinelli | H04N 1/64 |
| 2021/0287404 A1* | 9/2021 | Chang | H04N 19/12 |
| 2021/0351785 A1* | 11/2021 | Fenney | H04N 19/119 |
| 2022/0256178 A1* | 8/2022 | Bond | H04N 19/105 |
| 2022/0337799 A1* | 10/2022 | Chen | G06T 15/005 |
| 2023/0141312 A1* | 5/2023 | Elliot | G06T 3/4084 |
| | | | 382/232 |

FOREIGN PATENT DOCUMENTS

| | | | |
|---|---|---|---|
| JP | 2019087850 A | 6/2019 | |
| WO | 2014/055744 A1 | 4/2014 | |

* cited by examiner

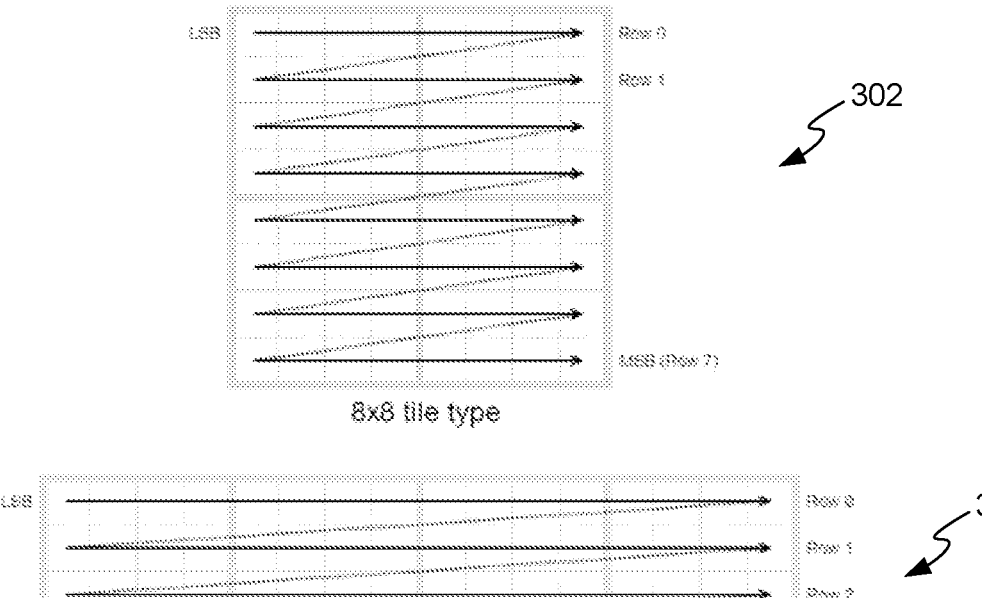
302
8x8 tile type
304
16x4 tile type
FIG. 3
FIG. 4
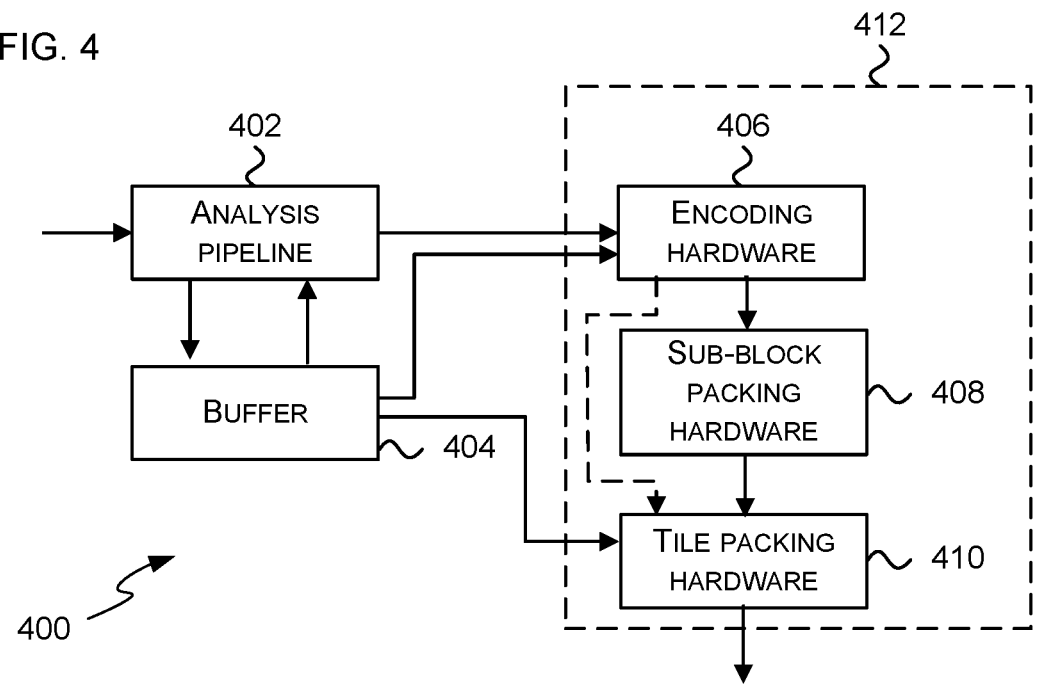
400

502

506

500

UNPACKING HARDWARE

DECODING HARDWARE

CONTROL HARDWARE

504

BLOCK OF COMPRESSED IMAGE DATA

602

DETERMINE NUMBER OF BITS OF COMPRESSED DATA CORRESPONDS TO ONE ROW OF PIXELS

604

IDENTIFY THE DECODING SCHEME FOR EACH GROUP OF PIXELS IN THE ROW

606

DECODE THE PIXELS USING THE IDENTIFIED DECODING SCHEME

BLOCK OF UNCOMPRESSED IMAGE DATA

FOR EACH MINI-BLOCK
FIG. 8
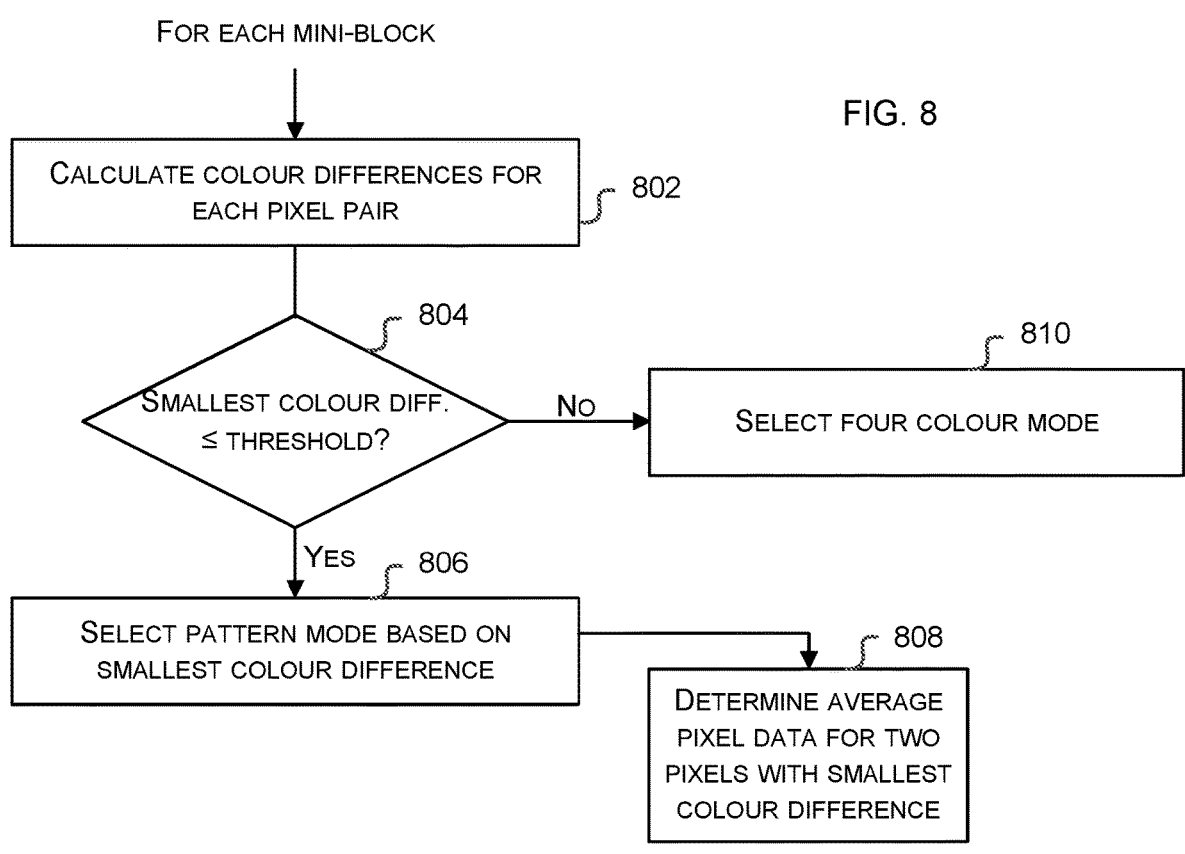
CALCULATE COLOUR DIFFERENCES FOR EACH PIXEL PAIR — 802
SMALLEST COLOUR DIFF. ≤ THRESHOLD? — 804
No → SELECT FOUR COLOUR MODE — 810
YES — 806
SELECT PATTERN MODE BASED ON SMALLEST COLOUR DIFFERENCE
DETERMINE AVERAGE PIXEL DATA FOR TWO PIXELS WITH SMALLEST COLOUR DIFFERENCE — 808
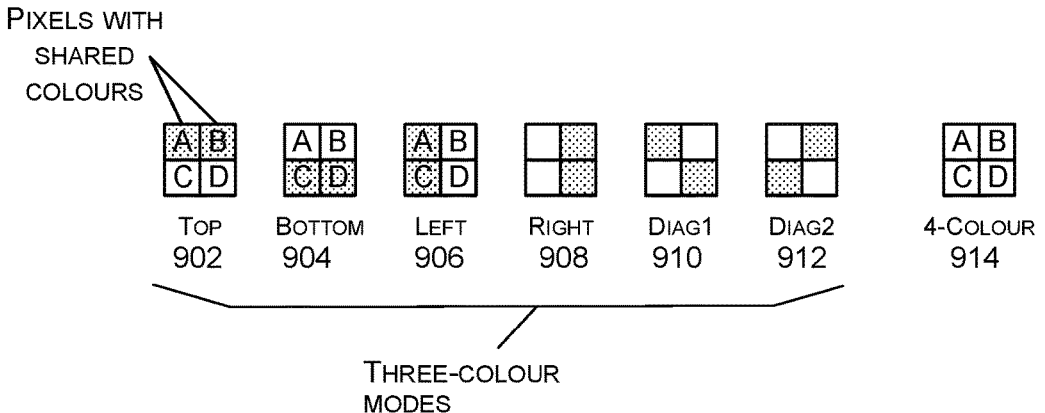
PIXELS WITH SHARED COLOURS
| TOP 902 | BOTTOM 904 | LEFT 906 | RIGHT 908 | DIAG1 910 | DIAG2 912 | 4-COLOUR 914 |
THREE-COLOUR MODES
FIG. 9

DATA FOR A PIXEL

1102

ANY MSB OF RGB = 1?

YES

NO

SET HDR FLAG    1104

CONVERT EACH OF RGB VALUES FROM 10 TO 8 BITS    1106

APPEND HDR FLAG TO ALPHA VALUE    1108

TRUNCATE EACH OF RGB VALUES BY REMOVING MSB AND LSB    1110

CONVERTED DATA FOR PIXEL a-BIT NUMBER

TRUNCATE a-BIT NUMBER FROM a TO b BITS — 1202

DETERMINE ADJUSTMENT VALUE — 1204

ADD ADJUSTMENT VALUE TO TRUNCATED NUMBER — 1206 b-BIT NUMBER

1302

ANALYSE ALPHA TO SELECT WHETHER TO USE VARIABLE OR CONSTANT ALPHA FOR SUB-BLOCK

204A

ANALYSE PIXEL DATA FOR THE SUB/MINI-BLOCK TO SELECT AN ENCODING PATTERN

204B

ENCODE PIXEL DATA USING SELECTED PATTERN

204

1600

1602

1604

CPU

GPU

1621

1614

DISPLAY          1616

SPEAKERS          1618

CAMERA          1620

1622

1606          MEMORY

1702

1704

CIRCUIT
LAYOUT
DEFINITION

1706

IC DEFINITION
DATASET

LAYOUT
PROCESSING

INTEGRATED
CIRCUIT
GENERATION

INTEGRATED
CIRCUIT

DATA COMPRESSION AND PACKING

BACKGROUND

Data compression, either lossless or lossy, is desirable in many applications in which data is to be stored in, and/or read from, a memory. By compressing data before storage of the data in a memory, the amount of data transferred to the memory may be reduced. An example of data for which data compression is particularly useful is image data, such as depth data to be stored in a depth buffer, pixel data to be stored in a frame buffer and texture data to be stored in a texture buffer. These buffers may be any suitable type of memory, such as cache memory, separate memory subsystems, memory areas in a shared memory system or some combination thereof.

A Graphics Processing Unit (GPU) may be used to process image data in order to determine pixel values of an image to be stored in a frame buffer for output to a display. GPUs usually have highly parallelised structures for processing large blocks of data in parallel. There is significant commercial pressure to make GPUs (especially those intended to be implemented on mobile devices) operate at lower power levels. Competing against this is the desire to use higher quality rendering algorithms on faster GPUs, which thereby puts pressure on a relatively limited resource: memory bandwidth. However, increasing the bandwidth of the memory subsystem might not be an attractive solution because moving data to and from, and even within, the GPU consumes a significant portion of the power budget of the GPU. The same issues may be relevant for other processing units, such as central processing units (CPUs), as well as GPUs.

The embodiments described below are provided by way of example only and are not limiting of implementations which solve any or all of the disadvantages of known methods of data compression and decompression.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of data compression is described. The method comprises receiving input pixel data for a block of data in raster scan order where the pixel data comprises at least red, green and blue channel data for each pixel. The pixel data is compressed using a block-based encoding scheme and then the compressed pixel data is output substantially in raster scan order.

A method of data decompression is described. The method comprises receiving compressed pixel data substantially in raster scan order and determining a number of bits of compressed data that corresponds to one row of pixels. Then, for each group of pixels in the row, the method identifies a block-based decoding scheme for the group of pixels and decodes the group of pixels using the identified scheme.

A first aspect provides a method of data compression comprising: receiving input pixel data for a block of data in raster scan order, the pixel data comprises at least first, second and third channel data for each pixel; compressing the pixel data substantially in raster scan order using a block-based encoding scheme; and outputting compressed pixel data substantially in raster scan order.

A second aspect provides data compression hardware comprising: an input for receiving input pixel data for a block of data in raster scan order, the pixel data comprises at least first, second and third channel data for each pixel; hardware logic arranged to compress the pixel data substantially in raster scan order using a block-based encoding scheme; and an output for outputting compressed pixel data substantially in raster scan order.

A third aspect provides a method of data decompression comprising: receiving compressed pixel data substantially in raster scan order; determining a number of bits of compressed data that corresponds to one row of pixels; and for each group of pixels in the row, identifying a block-based decoding scheme for the group of pixels and decoding the group of pixels using the identified scheme.

A fourth aspect provides data decompression hardware comprising: an input for receiving compressed image data substantially in raster scan order; control hardware arranged to determine a number of bits of compressed data that corresponds to one row of pixels; and decoding hardware arranged to decode groups of pixels, wherein either the control hardware or the decoding hardware is further arranged, for each group of pixels in the row, to identify a block-based decoding scheme for the group of pixels and wherein the decoding hardware is arranged to decode a group of pixels using the identified scheme.

The data compression and/or decompression unit as described herein may be embodied in hardware on an integrated circuit. There may be provided a method of manufacturing, at an integrated circuit manufacturing system, a data compression and/or decompression unit as described herein. There may be provided an integrated circuit definition dataset that, when processed in an integrated circuit manufacturing system, configures the system to manufacture a data compression and/or decompression unit as described herein. There may be provided a non-transitory computer readable storage medium having stored thereon a computer readable description of an integrated circuit that, when processed, causes a layout processing system to generate a circuit layout description used in an integrated circuit manufacturing system to manufacture a data compression and/or decompression unit as described herein.

There may be provided an integrated circuit manufacturing system comprising: a non-transitory computer readable storage medium having stored thereon a computer readable integrated circuit description that describes the data compression and/or decompression unit as described herein; a layout processing system configured to process the integrated circuit description so as to generate a circuit layout description of an integrated circuit embodying the data compression and/or decompression unit as described herein; and an integrated circuit generation system configured to manufacture the data compression and/or decompression unit as described herein according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 3 is a schematic diagram of two different format input blocks;

FIG. 4 is a schematic diagram of example compression hardware that is configured to implement the method of FIG. 2;

FIG. 8 is a flow diagram of an example method of compressing a sub-block;

FIG. 9 is a schematic diagram showing encoding patterns that may be used in the method of FIG. 8;

Figure 1:
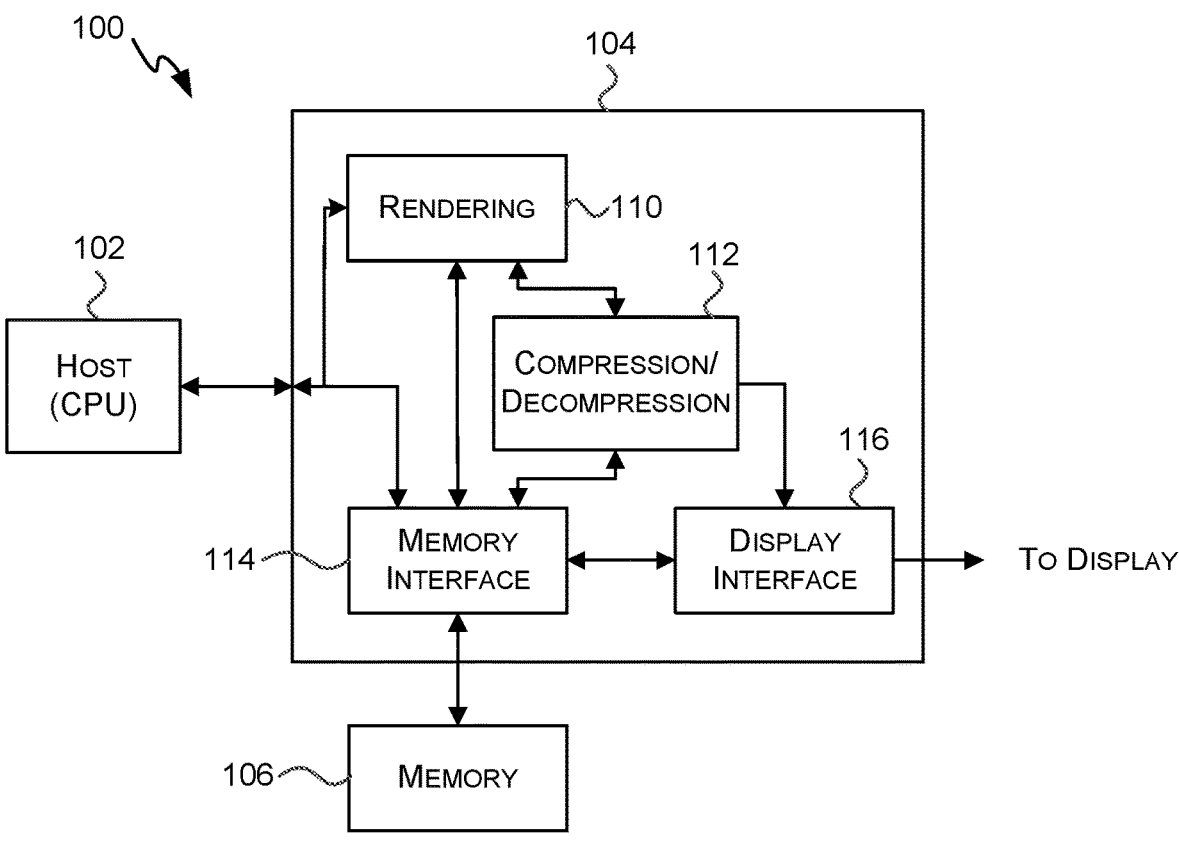
FIG. 1 shows a graphics rendering system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, memory bandwidth is a relatively limited resource within a processing unit (e.g. a CPU or GPU), similarly, memory space is a limited resource because increasing it has implications in terms of both physical size of a device and power consumption. Through the use of data compression before storage of data in a memory, both the memory bandwidth and the space in memory are reduced.

Data compression techniques may be lossless or lossy. With lossless compression techniques, the original data can be perfectly reconstructed from the compressed data. In contrast, where lossy compression techniques are used, data cannot be perfectly reconstructed from the compressed data and instead the decompressed data is only an approximation of the original data. Lossy compression techniques can typically compress data to a greater extent (i.e. achieve smaller compression ratios) than lossless compression techniques. The amount of compression that can be achieved using lossless compression techniques depends on the nature of the data that is being compressed, with some data being more easily compressed than other data.

The amount of compression that is achieved by a compression technique (whether lossless or lossy) may be expressed in terms of a percentage that is referred to herein as the compression ratio and is given by:

$$\text{Compression ratio} = \frac{\text{Compressed size}}{\text{Uncompressed size}} \times 100$$

This means that a compression ratio of 100% indicates that no compression has been achieved, a compression ratio of 50% indicates that the data has been compressed to half of its original, uncompressed size and a compression ratio of 25% indicates that the data has been compressed to a quarter of its original, uncompressed size.

It will be appreciated that there are other ways to define the compression ratio and there may be other ways to express the amount of compression that can be achieved by a data compression method, such as by reference to the size of a compressed block of data (e.g. in terms of the number of bytes).

The variability in the amount of compression that can be achieved (which is dependent upon characteristics of the actual data that is being compressed) has an impact on both memory bandwidth and memory space and may mean that the full benefit of the compression achieved is not realised in relation to one or both of these two aspects, as described below.

In many use cases, random access of the original data is required. Typically for image data, to achieve this, the image data is divided into independent, non-overlapping, rectangular blocks prior to compression. If the size of each compressed block varies because of the nature of the data in the block (e.g. a block which is all the same colour may be compressed much more than a block which contains a lot of detail) such that in some cases a block may not be compressed at all, then in order to maintain the ability to randomly access the compressed data blocks, the memory space may be allocated as if the data was not compressed at all. Alternatively, it is necessary to maintain an index, with an entry per block that identifies where the compressed data for that block resides in memory. This requires memory space to store the index (which is potentially relatively large) and the memory accesses (to perform the look-up in the index) adds latency to the system. For example, in systems where it is important to be able to randomly access each compressed block of data and where an index is not used, even if an average compression ratio (across all data blocks) of 50% is achieved, memory space still has to be allocated assuming a 100% compression ratio, because for some blocks it may not be possible to achieve any compression using lossless compression techniques.

Furthermore, as the transfer of data to memory occurs in fixed size bursts (e.g. in bursts of 64 bytes), for any given block there are only a discrete set of effective compression ratios for the data transfer to memory. For example, if a block of data comprises 256 bytes and the transfer of data occurs in 64 byte bursts, the effective compression ratios for the data transfer are 25% (if the block is compressed from 256 bytes to no more than 64 bytes and hence requires only a single burst), 50% (if the block is compressed into 65-128 bytes and hence requires two bursts), 75% (if the block is compressed into 129-192 bytes and hence requires three bursts) and 100% (if the block is not compressed at all or is compressed into 193 or more bytes and hence requires four bursts). This means that if a block of data comprising 256 bytes is compressed into anywhere in the range of 129-192 bytes, then three bursts are required for the compressed block, compared to four for the uncompressed block, making the effective compression ratio for the memory transfer 75% whilst the actual data compression achieved could be much lower (e.g. as low as 50.4% if compressed into 129 bytes). Similarly, if the compression can only compress the block into 193 bytes, the memory transfer sees no benefit from the use of data compression, as four bursts are still required to transfer the compressed data block to memory. In other examples, blocks of data may comprise a different number of bytes, and bursts to memory may comprise a different number of bytes.

The compressed data may be packed into a data structure (which may be referred to as a compressed data block) prior to being transmitted to the memory or to another device. As part of the data decompression process, the compressed data is unpacked (e.g. extracted from the data structure) before being decompressed. The way in which the compressed data is packed into the data structure (i.e. the order in which bits are placed into a data structure) can affect the operation of both the compression and decompression hardware (in particular the amount of buffering that is required) and hence can impact the size of this hardware and the efficiency of its operation (e.g. in terms of speed, processing power, power consumption, etc.).

Described herein are methods of performing data compression and data packing of pixel data (e.g. RGB/RGBA/ARGB pixel data) along with the corresponding data unpacking and decompression methods that provide improved efficiency of both the compression operation and the decompression operation, e.g. the compression and decompression operations can be implemented efficiently in hardware (e.g. the size of the hardware is small). For example, the compression hardware can be implemented efficiently in hardware because the amount of multiplexing hardware that is required is reduced and the decompression hardware can be implemented efficiently in hardware for the same reason and also because the amount of buffering that is required is reduced. This may be particularly useful in implementations where space is limited (e.g. mobile/portable/hand-held computing devices such as smart phones, tablet computers, portable gaming devices, smart watches, etc.). The methods described herein may be used to provide a guaranteed compression ratio (e.g. 50%) or fixed compressed block size (where this may be defined in terms of the number of bits/bytes, e.g. 128 bytes, or the number of bits per pixel, e.g. 16 bits). In various examples, the methods described herein provide a packing scheme for the compressed data that has easily determined boundaries between data for different pixels (or groups of pixels, such as pairs of pixels) which result in further efficiencies in the unpacking and decoding operations of the decompression process (and hence the decompression hardware is less complex and more efficient).

As described in more detail below, the methods of methods of performing data compression and data packing of pixel data involve sub-division of an input block of uncompressed image data. The sub-division may be a one step process (which divides a block into a plurality of sub-blocks), a two step process (which divides a block to a plurality of sub-blocks and then divides each sub-block into a plurality of mini-blocks) or may comprise more than two steps (with the resulting blocks still referred to as mini-blocks). Irrespective of the number of sub-division steps, the input block is sub-divided into a plurality of smaller blocks which may be referred to collectively as 'part-blocks'. Consequently, the term 'part-block' may refer to either a sub-block or a mini-block.

FIG. 1 shows a graphics rendering system 100 that may be implemented in an electronic device, such as a mobile device. The graphics rendering system 100 comprises a host CPU 102, a GPU 104 and a memory 106 (e.g. a graphics memory). The CPU 102 is arranged to communicate with the GPU 104. Data, which may be compressed data, can be transferred, in either direction, between the GPU 104 and the memory 106.

The GPU 104 comprises a rendering unit 110, a compression/decompression unit 112, a memory interface 114 and a display interface 116. The system 100 is arranged such that data can pass, in either direction, between: (i) the CPU 102 and the rendering unit 110; (ii) the CPU 102 and the memory interface 114; (iii) the rendering unit 110 and the memory interface 114; (iv) the memory interface 114 and the memory 106; (v) the rendering unit 110 and the compression/decompression unit 112; (vi) the compression/decompression unit 112 and the memory interface 114; and (vii) the memory interface 114 and the display interface. The system 100 is further arranged such that data can pass from the compression/decompression unit 112 to the display interface 116. Images, which are rendered by the GPU 104, may be sent from the display interface 116 to a display for display thereon.

In operation, the GPU 104 processes image data. For example, the rendering unit 110 may perform scan conversion of graphics primitives, such as triangles and lines, using known techniques such as depth-testing (e.g. for hidden surface removal) and texturing and/or shading. The rendering unit 110 may contain cache units to reduce memory traffic. Some data is read or written by the rendering unit 110, to the memory 106 via the memory interface unit 114 (which may include a cache) but for other data, such as data to be stored in a frame buffer, the data preferably goes from the rendering unit 110 to the memory interface 114 via the compression/decompression unit 112. The compression/decompression unit 112 reduces the amount of data that is to be transferred across the external memory bus to the memory 106 by compressing the data, as described in more detail below.

The display interface 116 sends completed image data to the display. An uncompressed image may be accessed directly from the memory interface unit 114. Compressed data may be accessed via the compression/decompression unit 112 and sent as uncompressed data to the display 108. In alternative examples the compressed data could be sent directly to the display 108 and the display 108 could include logic for decompressing the compressed data in an equivalent manner to the decompression of the compression/decompression unit 112. Although shown as a single entity, the compression/decompression unit 112 may contain multiple parallel compression and/or decompression units for enhanced performance reasons.

Figure 2:
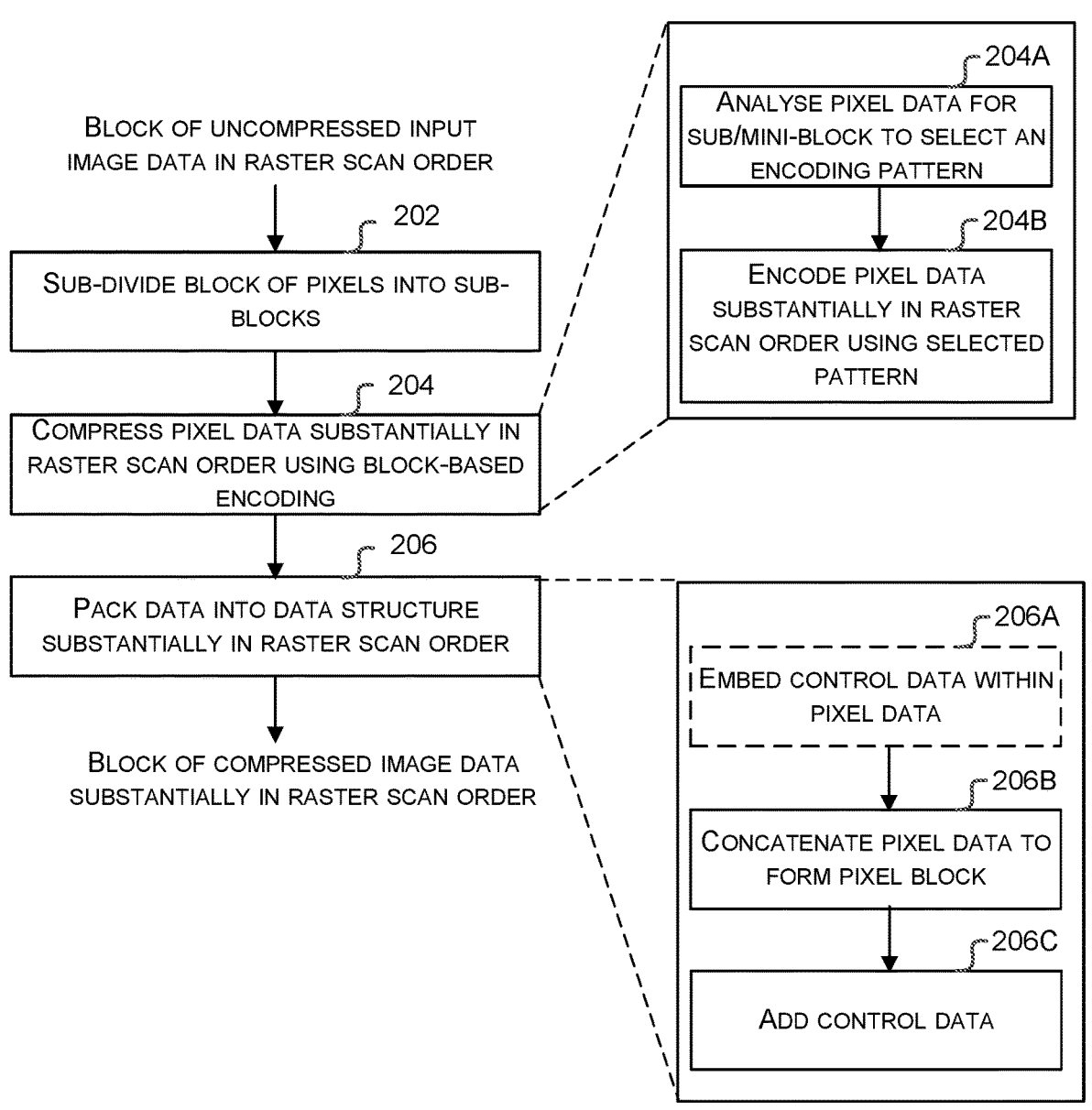
FIG. 2 is a flow diagram of an example method of data compression.

FIG. 2 shows a first example method of compression that may be performed by the compression/decompression unit 112. As shown in FIG. 2, the method takes as input, a block of uncompressed image data, i.e. concatenated pixel values. This image data may be RGB or RGBA data or in corresponding formats in which the channels are in a different order (e.g. ARGB data). Example formats include RGB888 format, RGBA8888 format, ARGB8888 format, RGBA1010102 format and ARGB2101010 format. The methods may also be used on other types of image data (e.g. YUV data); however, as the method utilises the colour correlation between channels, for some formats where there is less correlation, the methods may introduce some errors. Each block of image data that is received relates to a block of N×M pixels (where N and M are integers) and this block may also be referred to as a tile of pixels (for example in graphics processing apparatus that uses tile-based rendering techniques), e.g. blocks/tiles comprising 8×8 pixels 302 (N=M=8) or blocks/tiles comprising 16×4 pixels 304 (N=16, M=4), as shown in FIG. 3 and in the following description the terms 'tile' and 'block' may be used synonymously. The image data is received in raster scan order, i.e. pixel values are received row by row, starting with the least significant bit (LSB) in the first row (row 0) and ending with the most significant bit (MSB) in the last row (row 7 for tile 302 and row 3 for tile 304) as indicated by the arrows in FIG. 3.

As shown in FIG. 2, the input block of data is sub-divided into sub-blocks (block 202), each sub-block comprising n by m pixels where n and m are integers greater than one and where n and m may be different or the same. For input blocks (or tiles) 302, 304 comprising 8×8 pixels or 16×4 pixels, the block may be sub-divided into sub-blocks each comprising 4×4 pixels (n=m=4). In various examples, these sub-blocks may be further sub-divided into mini-blocks, each mini-block comprising n' by m' pixels where n' and m' are integers, m' is greater than one and where n' and m' may be different or the same. In various examples, n' may also be greater than one. For example, a 4×4 sub-block may be sub-divided into four mini-blocks each comprising 2×2 pixels (n'=m'=2).

Having divided the blocks of data into sub-blocks (in block 202), compression is then performed using a block-based encoding scheme (block 204). The compression (in block 204) involves some analysis that is performed on sub-blocks to identify the particular encoding scheme (or pattern) to be used for each sub-block; however, the compression is performed on the data substantially in raster scan order. Where the sub-blocks are sub-divided into mini-blocks, the analysis may be implemented on a mini-block by mini-block basis, rather than a sub-block by sub-block basis. Any suitable block-based compression scheme may be used to perform the compression of the input image data in block 204.

The term 'substantially in raster scan order' is used herein to refer to an ordering of the pixel data which, for most encoding schemes, is exactly in raster scan order (where raster scan order is indicated by the arrows in the two examples in FIG. 3); however, in a small proportion of encoding schemes (e.g. in only one of all the encoding schemes used), isolated pixel values may be output ahead of where they should be output according to exact raster scan order. This ordering is very different to ordering by sub-block or by mini-block, as can be seen in FIG. 3. Referring to the second example 304, in FIG. 3 in which the block comprises four blocks, it can be seen that in raster scan order, the pixels from the first row, row 0, (starting with the LSB) of each sub-block are output, followed by the second row, row 1, of each sub-block, etc. In contrast, ordering by sub-block would result in an order that traversed the first row, row0, of the first sub-block, followed by the second, third and fourth rows of the first sub-block, then the first row, row0, of the second sub-block, followed by the second, third and fourth rows of the second sub-block, etc.

In various examples, the compression (in block 204) comprises analysing the pixel data for each sub-block or mini-block to select an encoding scheme and/or pattern to be used for that sub-block or mini-block (block 204A) and then compressing the pixel data in the sub-block/mini-block using the selected encoding scheme and/or pattern (block 204B). In such examples, the analysis (in block 204A) may be performed on a sub-block by sub-block (or mini-block by mini-block) basis whilst the encoding of the pixel data (in block 204B) may be performed on the input data substantially in raster scan order using the selected encoding schemes and/or patterns determined in the analysis stage. The different encoding schemes and/or patterns may be referred to as different compression modes. Various examples of pattern-based compression methods are described in detail below, for example with reference to FIGS. 8-10.

Having performed compression (in block 204), the compressed data is then packed into a compressed block of image data in which the compressed pixel data is not arranged in sub-block by sub-block (or mini-block by mini-block) order but is instead arranged substantially in raster scan order (block 206), i.e. the compressed pixels values are output substantially in the same order as they were received in the original uncompressed data, row by row starting with the first row and LSB first.

The packing of the data to form the compressed data block (in block 206) may comprise concatenating the compressed pixel data substantially in raster scan order (block 206B) and then concatenating the compressed pixel data with one or more bits of control data (block 206C). This concatenation with the control data (in block 206C) may comprise appending the one or more bits of control data (e.g. as LSBs) or prepending the one or more bits of control data (e.g. as MSBs). In various examples, the packing may additionally comprise embedding one or more bits of control data within the pixel data (block 206A) prior to the concatenation (in block 206B). Whether any control bits are embedded (e.g. whether block 206A is omitted) and exactly which control bits are added and in what position within the compressed pixel data (in block 206A) may be dependent upon the particular encoding scheme and/or pattern that is used for a particular sub-block or mini-block and/or the format of the input data and examples of this are described in more detail below.

In various examples the compressed data may be output (packed into a compressed data block for each input block) exactly in raster scan order; however, in some examples there may be a very small number of compression modes (e.g. encoding schemes and/or patterns) which result in a slight modification to the raster scan order for a small number of pixels only (e.g. one pixel per mini-block). In such examples, isolated pixel values may be output ahead of where they should be output according to exact raster scan order and in these cases, the compressed pixel data is still not output in sub-block by sub-block (or mini-block by mini-block) order but substantially in raster scan order. An example compression mode which results in a small variance from the exact raster scan order is described in detail below. In particular, using the compression and packing methods described herein, the decompression operation always has sufficient data to decompress (e.g. decode) the next pixel in raster scan order and does not need to store a compressed value while it waits to receive data (e.g. in a subsequent row) to enable decoding.

As the compressed data is output in substantially raster scan order (packed in that order into a compressed data block for each input block), rather than sub-block by sub-block, this reduces the amount of buffering that is required as part of the decompression operation.

FIG. 4 shows a schematic diagram of example compression hardware 400 that is configured to implement the method of FIG. 2 and may be implemented within the compression/decompression unit 112. The compression hardware 400 comprises an analysis pipeline 402, buffer 404 (which may be a FIFO), encoding hardware 406, sub-block packing hardware 408 and tile packing hardware 410.

The analysis pipeline 402 comprises an input that is configured to receive the uncompressed input image data in raster scan order and the pipeline is arranged to accommodate the pixel data for an entire input block (e.g. pixel data for 8×8 or 16×4 pixels in the examples shown in FIG. 3). The input data may, for example, be input to the analysis pipeline 402 at a rate of 8 pixels per clock cycle and the analysis pipeline 402 may include an output buffer (e.g. in the form of a FIFO with read and write pointers) at its output if the stages in the analysis pipeline accommodate fewer pixels than the entirety of the input block. In other examples, a buffer may additionally or instead be incorporated into the analysis pipeline 402 at another position (e.g. at its input) such that the pixel data for an entire input block (e.g. an entire tile) can be accommodated within the analysis pipeline 402.

The analysis pipeline 402 is arranged to perform the sub-division of the input block of pixels into sub-blocks and in some cases, the further sub-division of the sub-blocks into mini-blocks (block 202). As detailed above, each sub-block and each mini-block comprises more than one row of pixels (i.e. m>1 and m'>1). The analysis pipeline 402 is further arranged to analyse the pixel data for pixels in a sub-block or mini-block and identify an encoding scheme and/or pattern for each sub-block or for each mini-block within each sub-block (block 204A). The analysis pipeline 402 does not reorder the pixel data and so, following the analysis, it is arranged to output the pixel data to the encoding hardware 406 in raster scan order.

As well as outputting the pixel data, the analysis pipeline 402 is arranged to generate and output some control data that is used by the encoding hardware 406 and this control data may be output directly to the encoding hardware 406 or the analysis pipeline 402 may be configured to write the control data into the buffer 404. The control data comprises data identifying the encoding scheme and/or pattern which is to be used for each sub-block or mini-block and may additionally comprise other parameters that are used in the encoding operation. In various examples the analysis pipeline 402 is arranged to calculate any parameters that are used in encoding the data but which are calculated based on pixels from different rows in the block of input data or pixels which are not adjacent in raster scan order. This is because only the analysis pipeline 402 has this data available concurrently. In contrast, the encoding hardware 406 processes pixels in raster scan order. The generated parameters form part of the control data that is output to the encoding hardware 406 or written to the buffer 404.

In various examples the analysis pipeline 402 may be implemented as a large shift register with functional blocks arranged to perform comparisons (e.g. in block 804 of FIG. 8) and averaging (e.g. in block 808 of FIG. 8).

The encoding hardware 406 comprises an input for receiving the input pixel data in raster scan order from the analysis pipeline 402 and an input for receiving control data from the buffer 404. The control data that is read, by the encoding hardware 406, from the buffer 404 may comprise data identifying the encoding scheme and/or pattern which is to be used for each sub-block or mini-block and may include other control data, such as palette colour data (as described below). The encoding hardware 406 is arranged to encode the pixel data according to the identified encoding scheme and/or pattern for the particular sub-block or mini-block that a pixel is part of (block 204B) to generate the compressed pixel data. The encoding hardware 406 operates in raster scan order, not sub-block by sub-block or mini-block by mini-block. The encoding hardware 406 comprises an output for outputting the compressed pixel data substantially in raster scan order to the sub-block packing hardware 408 and may also comprise an output for outputting control data to the tile packing hardware 410.

The encoding hardware 406, sub-block packing hardware 408 and tile packing hardware 410 may be arranged to collectively pack the compressed pixel data (generated in the encoding hardware 406) into a data structure (block 206) and in various examples, these separate elements may be combined into a single encoding and packing hardware element 412. In various examples, the encoding hardware 406 may also be arranged to embed one or more control bits within the pixel data (block 206A) before outputting the compressed pixel data (with any embedded control bits) substantially in raster scan order. In various examples, one or more padding bits may also be embedded.

The sub-block packing hardware 408 comprises an input for receiving the compressed pixel data (which may comprise some embedded control and/or padding bits) output by the encoding hardware 406. As detailed above, the compressed pixel data is received substantially in raster scan order from the encoding hardware 406; however, as the encoding hardware 406 reduces the size (i.e. number of bits) of the data for each pixel, there are 'gaps' (e.g. unused bits) in the data words in between the compressed pixel data. The sub-block packing hardware 408 is arranged to concatenate the compressed pixel data (block 206B) such that the data remains substantially in raster scan order, i.e. the packing hardware is configured to perform packing but does not reorder the compressed pixel data. This packing operation comprises removing the 'gaps' and packing all the used bits (i.e. the bits of the compressed pixel data) together without changing the order of the compressed pixel data.

Figure 7:
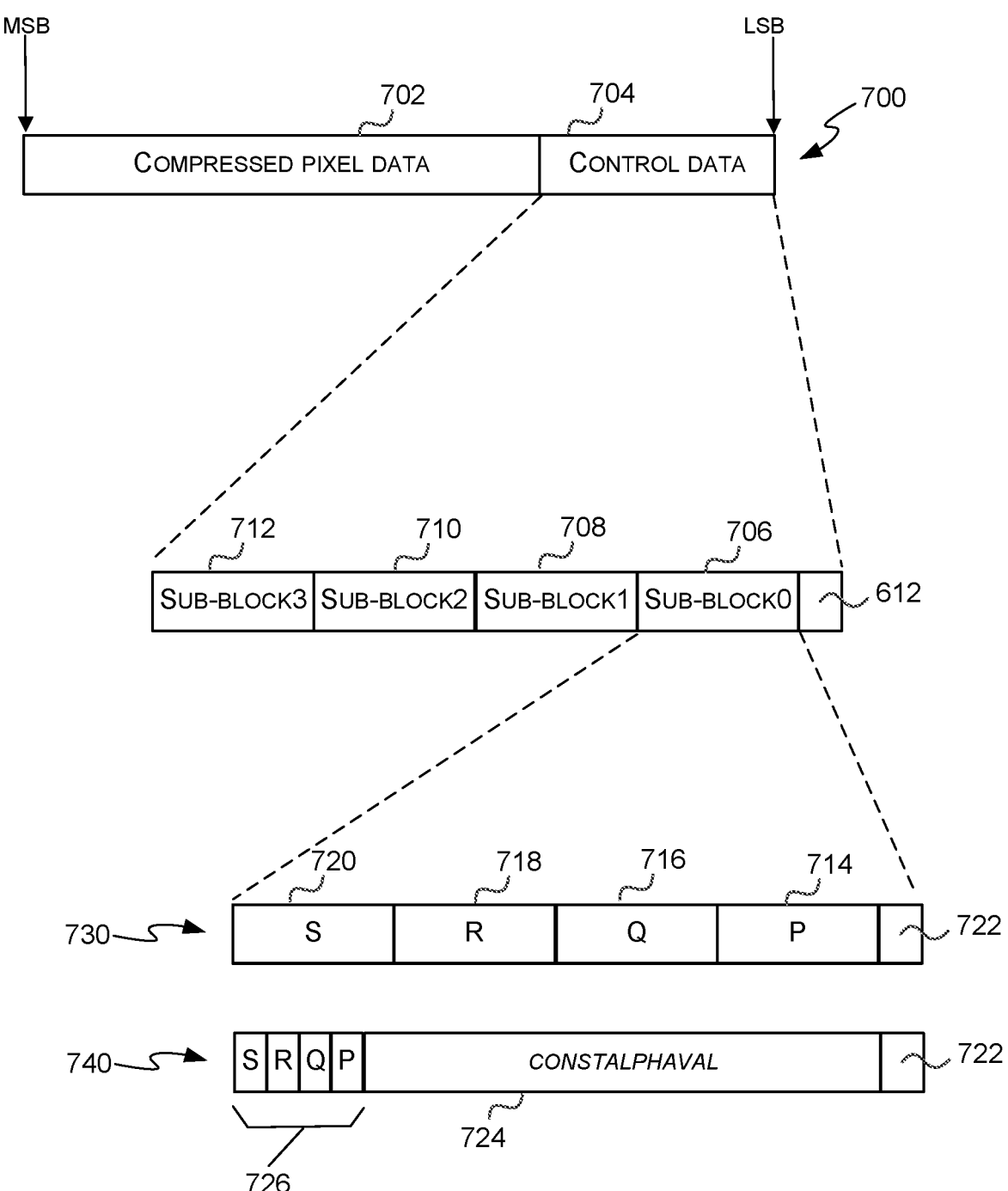
FIG. 7 is a schematic diagram of an example compressed data block.

The tile packing hardware 410 comprises one or more inputs for receiving the compressed pixel data block that is generated by the sub-block packing hardware 408 along with control data which may be read from the buffer 404 or received from the encoding hardware 406 (as indicated by the dotted arrow in FIG. 4). The tile packing hardware 410 is arranged to assemble a block of control data 704 and append this to the compressed pixel data block 702 to form the block of compressed image data 700 (block 206C). Unlike the block of compressed pixel data 702, the block of control data 704 may be arranged in sub-block by sub-block order, as shown in FIG. 7 (e.g. with separate portions 706-712 of the block of control data 704 relating to each of the sub-blocks in the input block). The tile packing hardware 410 further comprises an output for outputting the block of compressed image data. The control data in the control block 704 comprises different data to any embedded control bits within the pixel data block 702.

Figure 5:
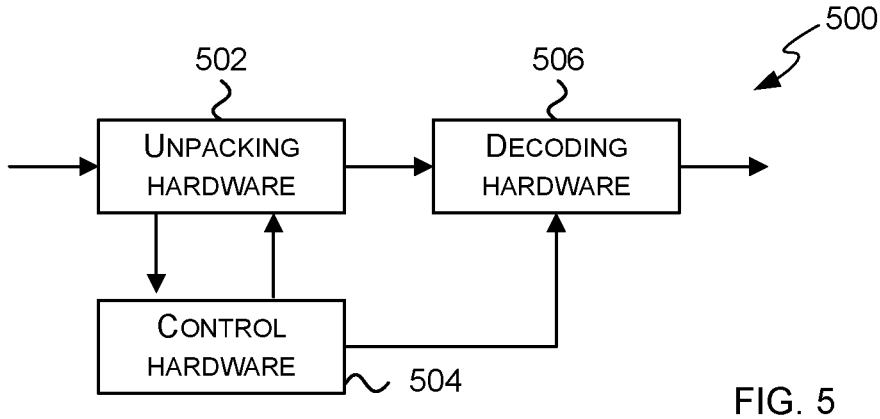
FIG. 5 is a schematic diagram of example decompression hardware that is configured to decompress compressed data generated using the method of FIG. 2.
Figure 6:
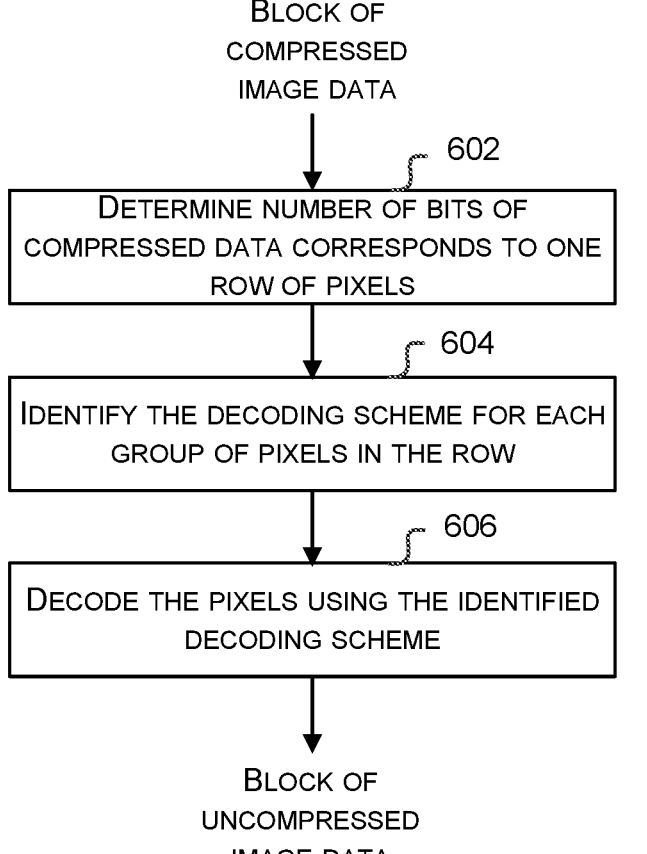
FIG. 6 is a flow diagram of an example of data decompression that may be implemented by the hardware of FIG. 5.

FIG. 5 shows a schematic diagram of example decompression hardware 500 that is configured to decompress data compressed using the method of FIG. 2 and may be implemented within the compression/decompression unit 112. The decompression hardware 500 is configured to implement the method of decompression shown in FIG. 6 and comprises unpacking hardware 502, control hardware 504 and decoding hardware 506.

The unpacking hardware 502 comprises an input for receiving the block of compressed image data 700. The block of compressed data may not be received as a single block but may be received incrementally over a number of clock cycles (e.g. dependent upon the burst size). The unpacking hardware 502 is arranged to pass the block of control data 704, which is the first part of the block of compressed data to be received, to the control hardware 504 which may be implemented as a state machine. The control hardware 504 is arranged to analyse the control data and based on the analysis to determine a number of bits in the pixel data block 702 that corresponds to each row of pixels in the input block (block 602). The control hardware 504 is configured to pass this information back to the unpacking hardware 502 and in response the unpacking pipeline is configured to pass pixel data corresponding to each row of the input block (e.g. the input tile) to the decoding hardware 506 in turn.

The control hardware 504 and/or the decoding hardware 506 is arranged to determine the encoding scheme and/or pattern that was used for each group of pixels in each row and hence the decoding scheme and/or pattern that needs to be used for decoding the those pixels (block 604), where a group of pixels in a row comprises those pixels in the row that belong to the same sub-block (where encoding was performed on a sub-block basis) or mini-block (where encoding was performed on a mini-block basis). The identification of decoding scheme and/or pattern may be performed either by the control hardware 504, based on the block of control data 704, or by the decoding hardware 506, based on based on control bits embedded within the compressed pixel data 702 and optionally based on data provided by the control hardware 504. Where the identification is performed by the control hardware 504, the control hardware 504 is configured to provide this information to the decoding hardware 506 and in this, or other examples, the control hardware 504 may be configured provide other data to the decoding hardware 506 that it has extracted from the block of control data. Where the identification is performed by the decoding hardware 506, the control hardware 504 may be configured to provide information identifying the positions of any embedded control bits within the compressed pixel data to the decoding hardware 506.

The decoding hardware 506 is arranged to decode the corresponding pixel data using the identified decoding schemes and/or patterns to (block 606) and to output decompressed pixel data in raster scan order. In various examples, the decoding hardware 506 is arranged to additionally use other data provided by the control hardware 504 to perform the decoding. For the particular encoding schemes and/or patterns which result in a deviation from strict raster scan order (as described above), the decoding hardware 506 is arranged to store the pixel data that is received ahead of its correct position in raster scan order, so that it can subsequently be output in exact raster scan order. In such examples, the decoding hardware 506 may be arranged to store either the encoded pixel data such that it is decoded in raster scan order, or the decoding hardware 506 may be arranged to perform the decoding in the order that the encoded pixel data is received and then to store the decoded pixel data prior to output in exact raster scan order. As noted above, the compression methods described herein ensure that the decoding hardware 506 always has sufficient data to decode the next pixel in raster scan order and does not need to wait for data to be provided out of order.

By using the methods described herein, the decompression hardware 500 may, in various examples, be implemented without any buffering for the compressed pixel data but instead with just pipeline stages control timing. The control hardware 504 may comprise buffers to store control data that is used by the decoding hardware 506; however, the size of the control data is small in comparison to the amount of compressed pixel data.

In various examples, the decoding hardware 506 described above may comprise a plurality of identical hardware units that operate in parallel on different bits within a row of pixels. Where the encoding scheme and/or pattern is identified on a per mini-block basis (where each mini-block comprises n'×m' pixels), there may be N/n' decoding hardware units (e.g. 4 decoding hardware units for the 8×8 tile 302 and 8 decoding units for the 16×4 tile 304 such that there is a decoding hardware unit for each mini-block in a row of the input tile) where each is configured to decode those n' pixels from within the row from a different mini-block. Similarly, where the sub-blocks are not sub-divided into mini-blocks, there may be N/n decoding hardware units (e.g. 2 decoding hardware units for the 8×8 tile 302 and 4 decoding units for the 16×4 tile 304) where each is configured to decode those n pixels from within the row from a different sub-block.

To further increase the efficiency of the compression/decompression unit 112, the compressed pixel data for a pixel or pair of pixels (i.e. a pair of adjacent pixels from the same row and same sub-block/mini-block) may be arranged to always be a multiple of P bits (where P is an integer e.g. P=10). This may be implemented as part of the encoding scheme and/or pattern (e.g. by the encoding hardware 406 in block 204B) and/or as part of the packing process (in block 206). In various examples, this may be implemented by embedding of control bits (e.g. by the encoding hardware 406 in block 206A) and/or one or more padding bits (e.g. by the encoding hardware 406 before, after or in place of block 206A).

By compressing each pixel or pair of pixels into a multiple of P bits, the hardware to implement the packing operation (in block 206 and in particular in block 206B) is simplified because there is less variability (i.e. there are fewer possible bit positions each pixel or pixel pair can be written to) and hence is more efficient (e.g. it can be implemented in smaller hardware since a reduced amount of multiplexing hardware is required). Similarly, the unpacking operation (in block 602) is simplified because the number of positions of the boundaries between compressed data for each pixel is significantly reduced (e.g. by a factor of P or P/2). In particular, where there are multiple identical decoding hardware units, this reduces the complexity of the hardware that distributes compressed pixel data to each of the decoding hardware units (e.g. as a multiple of P bits is always input to each of the decoding hardware units). Referring to FIG. 4, the data passed from the encoding hardware 406 to the sub-block packing hardware 408 may always be a multiple of P bits and referring to FIG. 5, the data passed from the unpacking hardware 502 to the decoding hardware 506 may always be a multiple of P bits.

As described above, the compression of pixel data (in block 204) may use one of a pre-defined set of encoding patterns and the encoding pattern may be determined (in block 204A and by the analysis pipeline 402) on a per sub-block or per mini-block basis. FIG. 8 is a flow diagram of an example method of analysing the pixel data to select an encoding pattern for use on a 2×2 mini-block. The method may be implemented by the analysis pipeline 402 and may alternatively be modified for use with for larger mini-blocks or sub-blocks rather than 2×2 mini-blocks, although this may result in a significantly larger number of encoding patterns in the pre-defined set of encoding patterns from which one is selected. As described above, whilst the encoding pattern is selected on a per sub-block/mini-block basis, the actual encoding is performed in raster scan order.

As shown in FIG. 8, the method comprises calculating a colour difference for each pixel pair in the 2×2 mini-block (block 802), with the most similar pixel having the smallest colour difference to the particular pixel and where colour difference between a pixel and a neighbour pixel (i.e. between a pair of pixels) may be calculated as:

$$|\text{Red difference}|+|\text{Green difference}|+|\text{Blue difference}|+|\text{Alpha difference}|$$

Having calculated the three colour differences (in block 802), one for each pixel pair, the smallest colour difference for any pixel pair in the mini-block is used to determine the mini-block encoding mode that is used (block 802). In this example, there are two distinct types of mini-block encoding modes that are used dependent upon whether the smallest colour difference (between any pixel pair in the mini-block) exceeds a threshold value (which may, for example be set at a value in the range 0-50, e.g. 40). If the smallest colour difference does not exceed the threshold ('Yes' in block 804), then one of six pre-defined three colour encoding patterns 902-912 are selected (block 806) and one average palette colour is calculated (block 808). However, if the smallest colour difference does exceed the threshold ('No' in block 804) then a four colour mode 914 is selected (block 810). These different mini-block modes 902-914 are shown in FIG. 9. The encoding patterns rely on an assumption that in the majority of mini-blocks there are no more than three distinct colours and in such cases the mini-block can be represented by three palette colours along with an assignment of pixels to palette entries. The four colour mode is present to handle the exceptions to this and the threshold (used in block 804) provides an approximation to select the mode with the least error.

As noted above, the value of the threshold may be in the range 0-50. In various examples it may be a fixed value that is set at design time. Alternatively, it may be a variable which is stored in a global register and read each time the method of FIG. 8 is performed. This enables the threshold to be changed dynamically or at least periodically. In various examples, the value of the threshold may be set based on results from a training phase. The training phase may use an image quality metric, for example peak signal-to-noise ratio (PSNR) or structural similarity metric (SSIM) to assess a selection of images compressed using each of the three colour modes 902-912 or the four colour mode 914 and then the threshold value may be selected such that overall the highest image quality metrics are obtained. It will be appreciated that in other examples, block 804 may be replaced by a different test.

As shown in FIG. 8, if the smallest colour difference is smaller than or equal to the threshold ('Yes' in block 804), such that a three colour encoding pattern can be used, the particular pattern that is used is selected from a set of six assignment patterns as shown in FIG. 9 based on the pixel pair (in the mini-block) that has the smallest colour difference (block 806). In each pattern in FIG. 9, the two pixels that are shown shaded are the two with the smallest colour difference. If the smallest colour difference is for pixel pair AB, then the mode that is selected is the mode 902 called 'Top'. If the smallest colour difference is for pixel pair CD, then the mode that is selected is the mode 904 called 'Bottom'. If the smallest colour difference is for pixel pair AC, then the mode that is selected is the mode 906 called 'Left'. If the smallest colour difference is for pixel pair BD, then the mode that is selected is the mode 908 called 'Right'. If the smallest colour difference is for pixel pair AD, then the mode that is selected is the mode 910 called 'Diag1'. If the smallest colour difference is for pixel pair BC, then the mode that is selected is the mode 912 called 'Diag2'.

Having selected a three-colour encoding mode (in block 806), a new pixel colour is calculated by averaging the source pixel colours for the two pixels in the pixel pair with the smallest colour difference (block 808). In various examples the new pixel colour may be calculated in 5555 format and this provides a 50% compression ratio. Where other compression ratios are required, the average pixel data may be calculated with a different bit depth. The following pseudo-code shows an example implementation of this calculation, where the two pixels in the pixel pair are denoted Pix1 and Pix2 and the RGBA values are denoted .red, .grn, .blu and .alp.

```
PIXEL Average(PIXEL Pix1, PIXEL Pix2)
{
    PIXEL Result;
    Result.red := (Pix1.red + Pix2.red + 1) >> 1;
    Result.grn := (Pix1.grn + Pix2.grn + 1) >> 1;
    Result.blu := (Pix1.blu + Pix2.blu + 1) >> 1;
    Result.alp := (Pix1.alp + Pix2.alp + 1) >> 1;
    Return Result;
}
```

Whilst the above pseudo-code includes the alpha value, where the alpha mode has a constant value or a compression mode that is used involves a constant alpha value, the same technique may be used but omitting the alpha channel. Use of a constant alpha value is described in more detail below. Similarly, where there is no alpha channel (e.g. for RGB data), this is omitted from the calculation.

The average pixel data that is calculated (in block 810) in the event that a three colour mode is selected is generated by the analysis pipeline 402 and may then be written to the buffer 404 so that it can be subsequently read by the encoding hardware 406 and used when encoding the pixel data (in block 204B). The average pixel data is calculated (in block 810) as part of the selection of an encoding pattern (in block 204A) by the analysis pipeline 402 and not by the encoding hardware 406 because the encoding hardware 406 processes pixel data substantially in raster scan order. This means that when the encoding hardware 406 is encoding pixels from one row, the encoding hardware 406 does not have access to pixel data from a subsequent row and hence cannot calculate the average pixel data for four of the six three colour modes 906-912. The average pixel data therefore forms part of the control data generated by the analysis pipeline 402 (as described above).

Similarly, where the 'top' mode 902 is selected (in block 806), the value of input pixel C is written to the buffer 404 so that it can be subsequently read by the encoding hardware 406 and used when encoding the pixel data (in block 204B). As described above, the encoding hardware 406 processes pixel data substantially in raster scan order and so when the encoding hardware 406 is encoding pixels from one row, the encoding hardware 406 does not have access to pixel data from a subsequent row. If the 'top' mode is selected, the value of input pixel C therefore forms part of the control data generated by the analysis pipeline 402 (as described above). Where the value of input pixel C is written to the buffer, it may be converted into a different format prior to being written (e.g. from 8888 format to 5555 format) or alternatively any format conversion may be performed by the encoding hardware 406 after the value has been read from the buffer.

Figure 10:
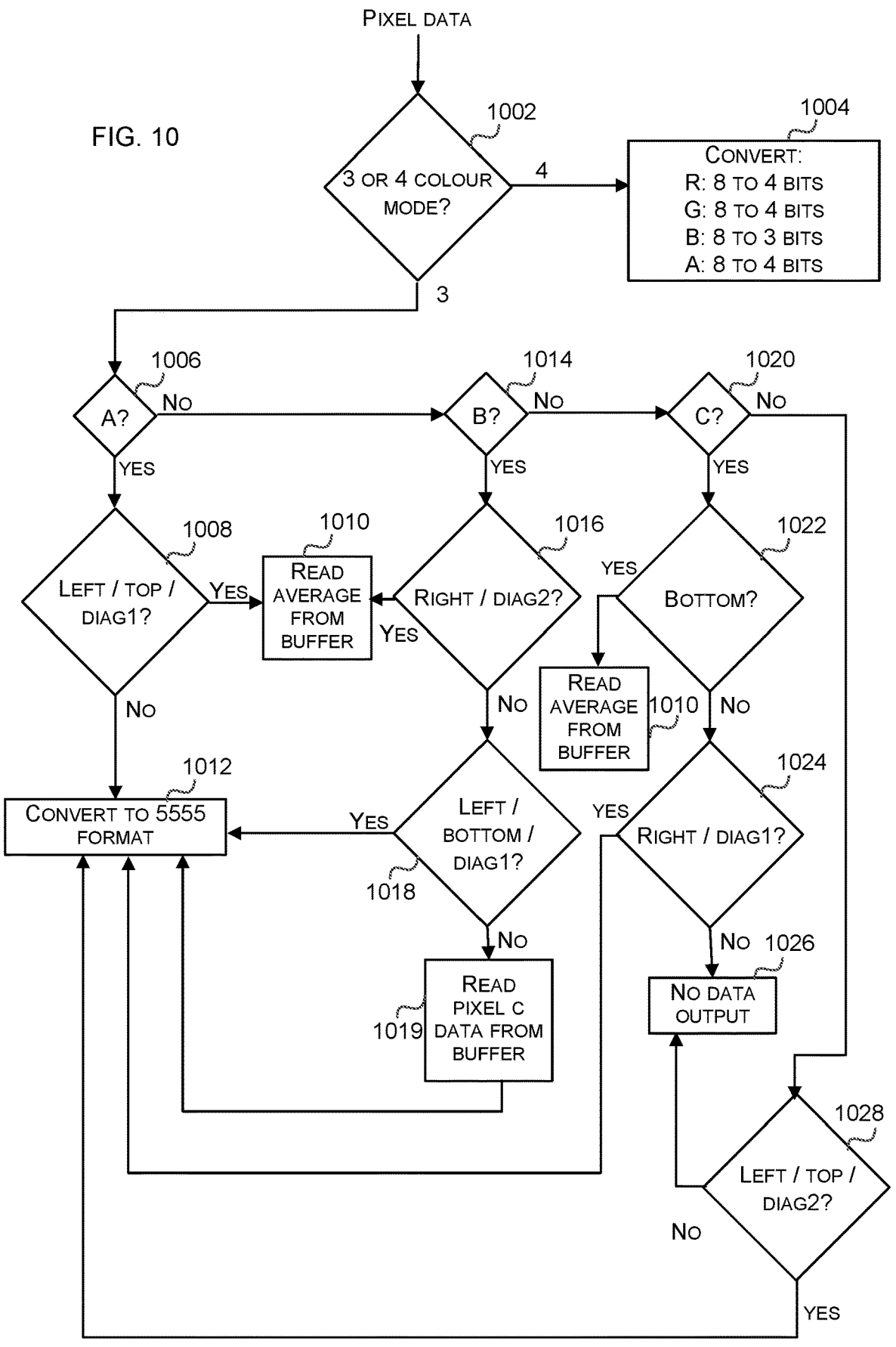
FIG. 10 is a flow diagram of an encoding method of that may be used in the method of FIG. 2.

Having selected one of the pre-defined encoding modes (in block 204A, e.g. as shown in FIG. 8), the encoding operation (in block 204B) will depend upon the selected mode, the input data format and in various examples, upon other factors as well, such as the compression ratio that is required. An example for RGBA8888 or ARGB8888 format data is shown in FIG. 10 and also set out in the table below which provides a 50% compression ratio. In examples where a different compression ratio is required, the conversion stages (in blocks 1004 and 1012) may be modified accordingly. The table below (table 1) sets out for each encoding mode and for each input pixel, what the encoded pixel data (which may be denoted output pixels A-D) comprises. As can be seen in table 1, for the three colour modes, either output pixel C or output pixel D contains data (and not both).

TABLE

| | Input pixel A | Input pixel B | Input pixel C | Input pixel D |
|---|---|---|---|---|
| Top 902 | Average of input pixels A and B, read from buffer | Input pixel C data, read from buffer and converted from 8888 format to 5555 format | No encoded pixel data output | Input pixel data converted from 8888 format to 5555 format |
| Bottom 904 | Input pixel data converted from 8888 format to 5555 format | Input pixel data converted from 8888 format to 5555 format | Average of input pixels C and D, read from buffer | No encoded pixel data output |
| Left 906 | Average of input pixels A and C, read from buffer | Input pixel data converted from 8888 format to 5555 format | No encoded pixel data output | Input pixel data converted from 8888 format to 5555 format |
| Right 908 | Input pixel data converted from 8888 format to 5555 format | Average of input pixels B and D, read from buffer | Input pixel data converted from 8888 format to 5555 format | No encoded pixel data output |
| Diag1 910 | Average of input pixels A and D, read from buffer | Input pixel data converted from 8888 format to 5555 format | Input pixel data converted from 8888 format to 5555 format | No encoded pixel data output |
| Diag2 912 | Input pixel data converted from 8888 format to 5555 format | Average of input pixels B and C, read from buffer | No encoded pixel data output | Input pixel data converted from 8888 format to 5555 format |
| Four colour mode 914 | Input pixel data converted: Red: 8 to 4 bits Green: 8 to 4 bits Blue: 8 to 3 bits Alpha: 8 to 4 bits | | | |

As shown in the table above and in FIG. 10, the method takes as input, input pixel data for a single pixel. This pixel data is received in raster scan order and each pixel belongs to a mini-block and is pixel A, B, C or D in that mini-block and the mini-block that it is part of and its position in that mini-block (i.e. as pixel A, B, C or D) will affect the way that the pixel data is encoded. Pixels A and B form part of an even row (row 0, row 2, . . . ) with pixel A before pixel B in raster scan order and pixels C and D form part of an odd row (row 1, row 3, . . . ) with pixel C before pixel D in raster scan order.

If the selected mode is four colour mode for the mini-block that the pixel is part of ('Yes' in block 1002) then irrespective of whether the input pixel is at position A, B, C or D in the mini-block, the encoding operation (in block 204A) proceeds in the same way by converting the 8888 format data to 4434 format data (block 1004). If, however, the selected mode is a three colour mode, then the encoding operation will differ based on the position of the pixel in the mini-block and the selected encoding mode and for every odd row, there is only a single pixel of encoded data output (e.g. output pixel C or output pixel D). This is because there are only three colours output in such modes.

If the pixel is in position A in the mini-block ('Yes' in block 1006), then if the selected mode is top 902, left 906 or diag1 910 ('Yes' in block 1008), the encoding operation comprises reading an average pixel value from the buffer 404 (block 1010). Dependent upon the mode, a different average will have been calculated previously by the analysis pipeline 402 and written to the buffer 404 as detailed above. Otherwise, the encoding operation comprises converting the pixel data from 8888 format to 5555 format (block 1012).

If the pixel is in position B in the mini-block ('No' in block 1006, 'Yes' in block 1014), then if the selected mode is right 908 or diag2 912 ('Yes' in block 1016), the encoding operation comprises reading an average pixel value from the buffer 404 (block 1010). Dependent upon the mode, a different average will have been calculated previously by the analysis pipeline 402 and written to the buffer 404 as detailed above. If the selected mode is bottom 904, left 906 or diag1 910 ('Yes' in block 1018), then the encoding operation comprises converting the pixel data from 8888 format to 5555 format (block 1012). Otherwise, the encoding operation comprises reading input pixel C data from the buffer 404 (block 1019) and, if this was not done prior to the data being stored in the buffer, the converting the pixel data from 8888 format to 5555 format (block 1012).

If the pixel is in position C in the mini-block ('No' in blocks 1006 and 1014, 'Yes' in block 1020), then if the selected mode is bottom 904 ('Yes' in block 1022), the encoding operation comprises reading an average pixel value from the buffer 404 (block 1010). Dependent upon the mode, a different average will have been calculated previously by the analysis pipeline 402 and written to the buffer 404 as detailed above. If the selected mode is right 908 or diag1 910 ('Yes' in block 1024), then the encoding operation comprises converting the pixel data from 8888 format to 5555 format (block 1012). Otherwise, no encoding operation is performed for this pixel data and the pixel data is discarded (block 1026).

Finally, if the pixel is in position D in the mini-block ('No' in blocks 1006, 1014 and 1020), then if the selected mode is top 902, left 906 or diag2 912 ('Yes' in block 1028), the encoding operation comprises converting the pixel data from 8888 format to 5555 format (block 1012). Otherwise, no encoding operation is performed for this pixel data and the pixel data is discarded (block 1026).

It will be appreciated that the decisions in FIG. 10 may be organised differently whilst still achieving the same outcomes (e.g. the outcomes shown in table 1 above).

The method of FIG. 10 compresses each pixel or pair of pixels into a multiple of P bits where P=10. In the four colour mode, each pair of compressed pixels comprises 30 bits, in the three colour mode, each compressed pixel comprises 20 bits and in the two colour mode, each compressed pixel comprises 30 bits. As described below, by ensuring that each pixel or pair of pixels is compressed to a multiple of P bits, the packing operation, and hence the packing hardware, is simplified.

In the description above, there are seven different encoding patterns or modes 902-914 (six three colour modes and one four colour mode) as shown in FIG. 9. In various examples there may be one additional two colour mode in which pixels A and B share a palette colour which is the average of pixels A and B and pixels C and D share a palette colour which is the average of pixels C and D. As only two palette colours are stored (compared to the three or four in the other encoding modes), the palette colours may be stored at higher precision (e.g. RGBA7878). This two palette colour mode may, for example, be used if the colour difference between pixels A and B and the colour difference between pixels C and D are both less than a pre-defined threshold.

Where this additional two palette colour mode is used, an additional test against the pre-defined threshold (which may be different from the threshold used in block 804) may be inserted between blocks 802 and 804 in FIG. 8. If the test is passed, then the two colour mode is selected and the two average pixel colours are calculated and written to the buffer (e.g. in a similar manner to block 808). Alternatively the averaging may be performed in the encoding hardware 406 as two adjacent pixels in the same row are being averaged; however, this would require averaging hardware within the encoding hardware 406 as well as the analysis pipeline 402 and hence may be less efficient in terms of hardware size. It will be appreciated that in other examples there may be additional two colour modes (e.g. where different pairs of pixels share a palette colour, such as pixels A and C and pixels B and D).

In the encoding operation (in block 204B) and where the two colour mode is used, an additional row, provided below in table 2, is added to table 1 above. Similarly FIG. 10 may be modified to include additional decision blocks, such that if the two colour mode has been selected, for a pixel in position A or C, then an average value is read from the buffer (block 1010) and for a pixel in position B or D, no encoding operation is performed for this pixel data and the pixel data is discarded (block 1026), i.e. for every row (whether even or odd), there is only a single pixel of encoded data output per input pixel pair from the same mini-block (e.g. for an even row, output pixel A, and for an odd row, output pixel C, where in each row, the output pixel is an average of the two input pixels in that row).

TABLE 2

|  | Input pixel A | Input pixel B | Input pixel C | Input pixel D |
|---|---|---|---|---|
| Two colour mode | Average of input pixels A and B, read from buffer | No encoded pixel data output | Average of input pixels C and D, read from buffer | No encoded pixel data output |

In various examples, each of the encoding modes may be identified by a 3-bit encoding value as detailed in the table below (table 3) and these three bits may be written to the buffer 404 by the analysis pipeline 402 and used by the encoding hardware 406 when encoding the input pixel data. In various examples, the values may be included within the block of control data 704 that is added (e.g. appended or prepended) by the tile packing hardware 410 to the encoded pixel data (in block 206C) and in other examples they may be embedded in the pixel data (in block 206A).

TABLE 3

| Encoding Mode | Encoding Value | Encoding Mode | Encoding Value |
|---|---|---|---|
| Four colour | 101 | Two colour | 100 |
| Top | 000 | Bottom | 001 |
| Left | 010 | Right | 011 |
| Diag1 | 110 | Diag2 | 111 |

As shown in FIG. 7, in various examples, the control data 730 for a sub-block 706-712 may comprise the concatenated encoding values 714-720 for each of the four mini-blocks in the sub-block. For example, if the control data for sub-block 0 comprises the concatenated encoded values: 111011000010, then mini-block P has been encoded using the Left encoding mode, mini-block Q has been encoded using the Top encoding mode, mini-block R has been encoded using the Right encoding mode and mini-block S has been encoded using the Diag2 encoding mode. There may be one or more additional bits 722 (e.g. 2 additional bits) within the control data for a sub-block. Another example of the control data 740 for a sub-block 706-712 is described below.

The methods of FIGS. 8 and 10 are described above in relation to 8888 format data. The methods may also be used for RGBA1010102 format or ARGB2101010 format data by first applying a pre-processing step that converts the source data into 888Z or Z888 format data plus a flag bit respectively, where Z is an integer that is not greater than 8, and then adjusting blocks 808, 1004 and 1012. In block 808, prior to averaging, the 8-bit values are converted up to 9-bit values if the flag is set and then instead of calculating a new pixel colour in 5555 format, the new pixel data is calculated in RGBA6652 or ARGB2665 format. In block 1004, instead of converting the pixel data to RGBA4434 or ARGB4443 format, the pixel data is converted to RGBA4442 or ARGB2444 format. In block 1012, instead of converting the pixel data to 5555 format, the pixel data is converted to RGBA6652 or ARGB2665 format.

Figure 11:
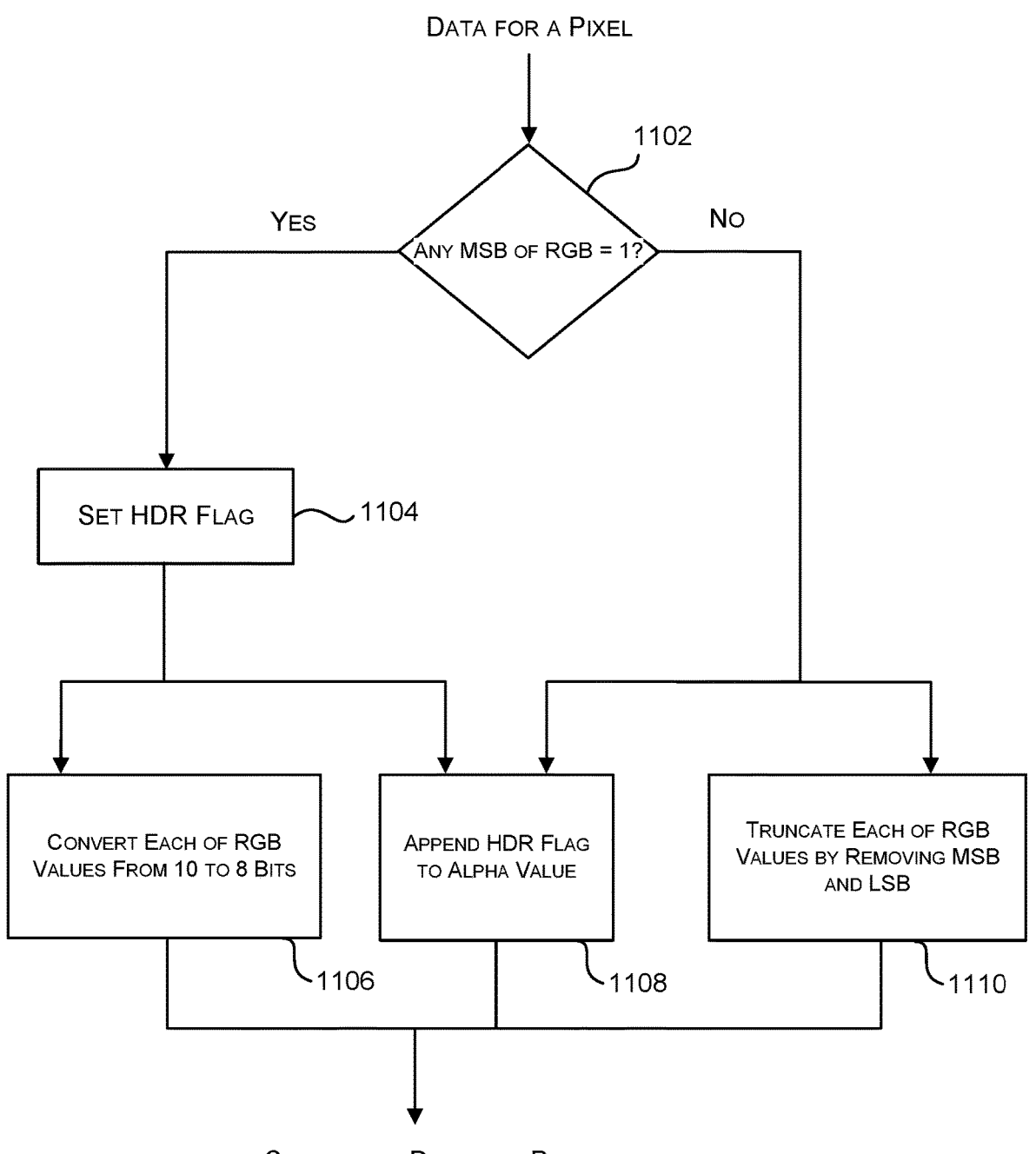
FIG. 11 is a flow diagram of a first example method of converting 10-bit data to 8-bit data.

An example pre-processing method, as described in GB2575436, is shown in FIG. 11. The method of FIG. 11 converts pixel data from RGBA1010102 format to RGBA8883 or from ARGB2101010 format to ARGB3888 format (i.e. Z=3) and sets the value of a flag. As shown in FIG. 11, the MSBs of each of the RGB channels are checked (block 1102) and if one or more of these three MSBs are equal to one ('Yes' in block 1102) then a flag is set (block 1104), otherwise the flag is not set. This flag may be referred to as the high-dynamic-range (HDR) flag because if at least one MSB is equal to one then it is likely that the pixel data is HDR data. HDR images can represent a greater range of luminance levels than non-HDR images and HDR images are typically created by merging multiple low- or standard-dynamic-range (LDR or SDR) photographs or by using a special image sensor. Hybrid log-gamma is an HDR standard that defines a non-linear transfer function in which the lower half of the signal values (this is the SDR part of the range) use an $x^2$ curve and the upper half of the signal values (this is the HDR part of the range) use a logarithmic curve and the reference white level is set to a signal value of 0.5. Of the 10 bits of R/G/B data, the most significant bit indicates whether a value is in the bottom half of the range (the SDR part) or in the top half of the range (the HDR part).

As well as setting the flag or not, the pixel data is reduced from 10-bits to 8-bits in different ways dependent upon whether one or more of the MSBs for the RGB channels is one. If none of the three MSBs are equal to one ('No' in block 1102), then each of the 10-bit values for the RGB channels is truncated by removing both the MSB (which is known to be a zero) and the LSB (block 1110). If any of the three MSBs are equal to one ('Yes' in block 1102), then there are two different ways in which the 10-bit values may be reduced to 8-bits (in block 1106). In a first example, the two LSBs may be removed from each 10-bit value and in a second example, the method as shown in FIG. 12 may be used.

Figure 12:
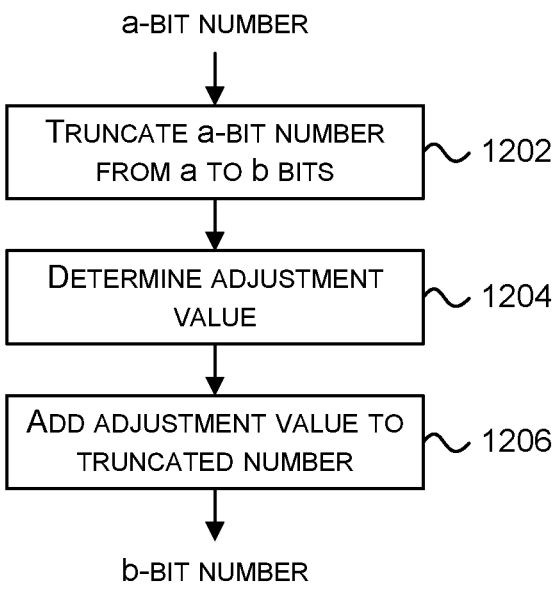
FIG. 12 is a flow diagram of an example method of converting an a-bit number to an b-bit number, where a>b.

FIG. 12 is an example method of converting an input a-bit number to an b-bit number where a and b are integers and a>b. As shown in FIG. 12, the method comprises receiving an input a-bit number, A, and truncating that number from a-bits to b-bits (block 1202). An adjustment value is then determined based on the input a-bit number, A, (block 1204) and this may be implemented using a number of AND and OR gates. These AND and OR logic gates (or alternative logic arrangements that are functionally equivalent) compare a plurality of pre-determined subsets of the bits of the input a-bit number with pre-determined values in fixed-function circuitry and based on the outcome of the comparisons, determine an adjustment value which is then added to the truncated value from block 1202 (block 1206). The value of the adjustment value is either zero, one, or minus one.

Where the method of FIG. 12 is used to pre-process RGBA1010102 or ARGB2101010 format data, a=10 and b=8 and the following example VHDL shows how the adjustment value is calculated (in block 1204):

```
function CorrectionsFor10to8(i : std_logic_vector(9 downto 0))
    return std_logic_vector is
        variable results:std_logic_vector(1 downto 0);
begin
    results:=(others=>'0');
    if std_match(i, "00------11") then results:=      "01"; end if;
    if std_match(i, "0-00----11") then results:= results OR "01"; end if;
    if std_match(i, "0-0-00--11") then results:= results OR "01"; end if;
    if std_match(i, "0-0-0-0011") then results:= results OR "01"; end if;
    if std_match(i, "1-1-1-1100") then results:= results OR "11"; end if;
    if std_match(i, "1-1-11--00") then results:= results OR "11"; end if;
```

-continued

```
    if std_match(i, "1-11----00") then results:= results OR "11"; end if;
    if std_match(i, "11------00") then results:= results OR "11"; end if;
    return results;
end function CorrectionsFor10to8;
```

It is estimated that approximately 25 AND/OR gates are required to determine the value of the adjustment value (in block 1204) for a=10 and b=8.

Irrespective of the values of the three MSBs for the RGB channels for the pixel, the 2-bit alpha channel value is modified in the same way. As shown in FIG. 11, the HDR flag is appended to the existing 2-bit value (block 1108), making the output alpha channel value 3-bits.

The method of FIG. 11 may be implemented on a per-pixel basis, although in variations on this method, the decision (in block 1102) that leads to the setting of the HDR block may alternatively be performed less frequently, e.g. on a per sub-block or per mini-block basis.

In various examples, in order to compress each pixel or pair of pixels into a multiple of P bits where P=10 for RGBA1010102 format or ARGB2101010 format data, the encoding and/or packing operation may include the addition of one or more padding bits. In the four colour mode, each pair of compressed pixels comprises 30 bits and hence no padding bits are required. In the three colour mode, each compressed pixel comprises 20 bits and again no padding pits are required; however, in the two colour mode, each compressed pixel comprises 27 bits and so three padding bits (e.g. 000) may be added such that each compressed pixel comprises 30 bits. As described below, by ensuring that each pixel or pair of pixels is compressed to a multiple of P bits, the packing operation, and hence the packing hardware, is simplified. The unpacking operation (and hardware) is also simplified.

In all the examples described above, the pixel data comprises four channels: red, green, blue and alpha (although they may be in a different order), and these compression methods may be collectively described as variable alpha modes. This does not mean that alpha has to vary between pixels, but it means that alpha is specified separately for each pixel and hence can vary. In other examples, however, one of a number of constant alpha compression modes may instead be used and there may be a corresponding constant alpha mode for each of the variable alpha modes described above. In a constant alpha mode, the pixel data that is compressed using the methods described above comprises only three channels: red, green and blue, and the alpha channel value is handled separately.

Figure 13:
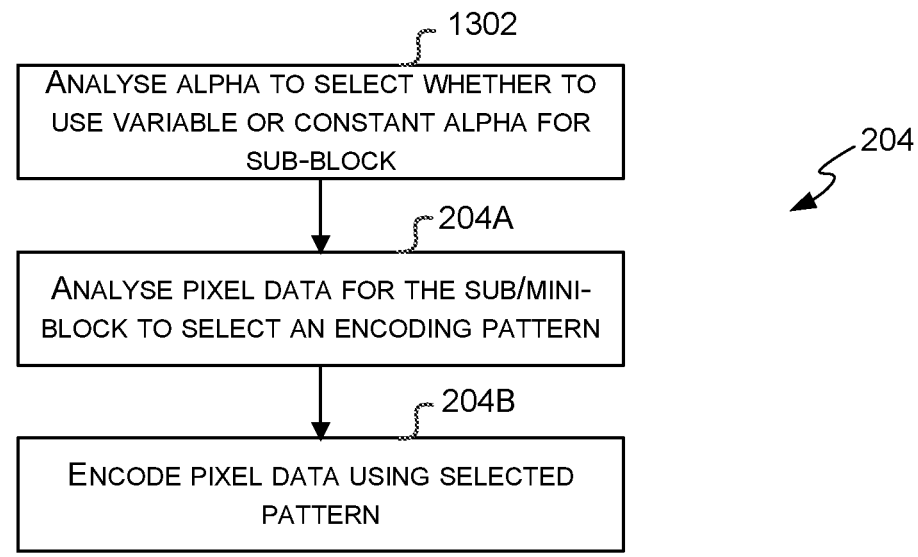
FIG. 13 is a flow diagram of another example method of data compression.

In various examples where both variable and constant alpha modes are available for selection (in block 204), an additional stage may be included, as shown in FIG. 13. As shown in FIG. 13, prior to selecting an encoding pattern for a sub-block or mini-block (in block 204A), it is determined on a per sub-block basis, whether the sub-block is compressed using a variable alpha mode or a constant alpha mode (block 1302). Where both constant alpha and variable alpha modes are used, the control block 704 may include a data field 722 (e.g. at the start of the data for each sub-block 706-712 within the control block 704, as shown in FIG. 7) that indicates whether variable or constant alpha modes are being used for each of the sub-blocks and in various examples, this may be a 2-bit field per sub-block.

Figure 14:
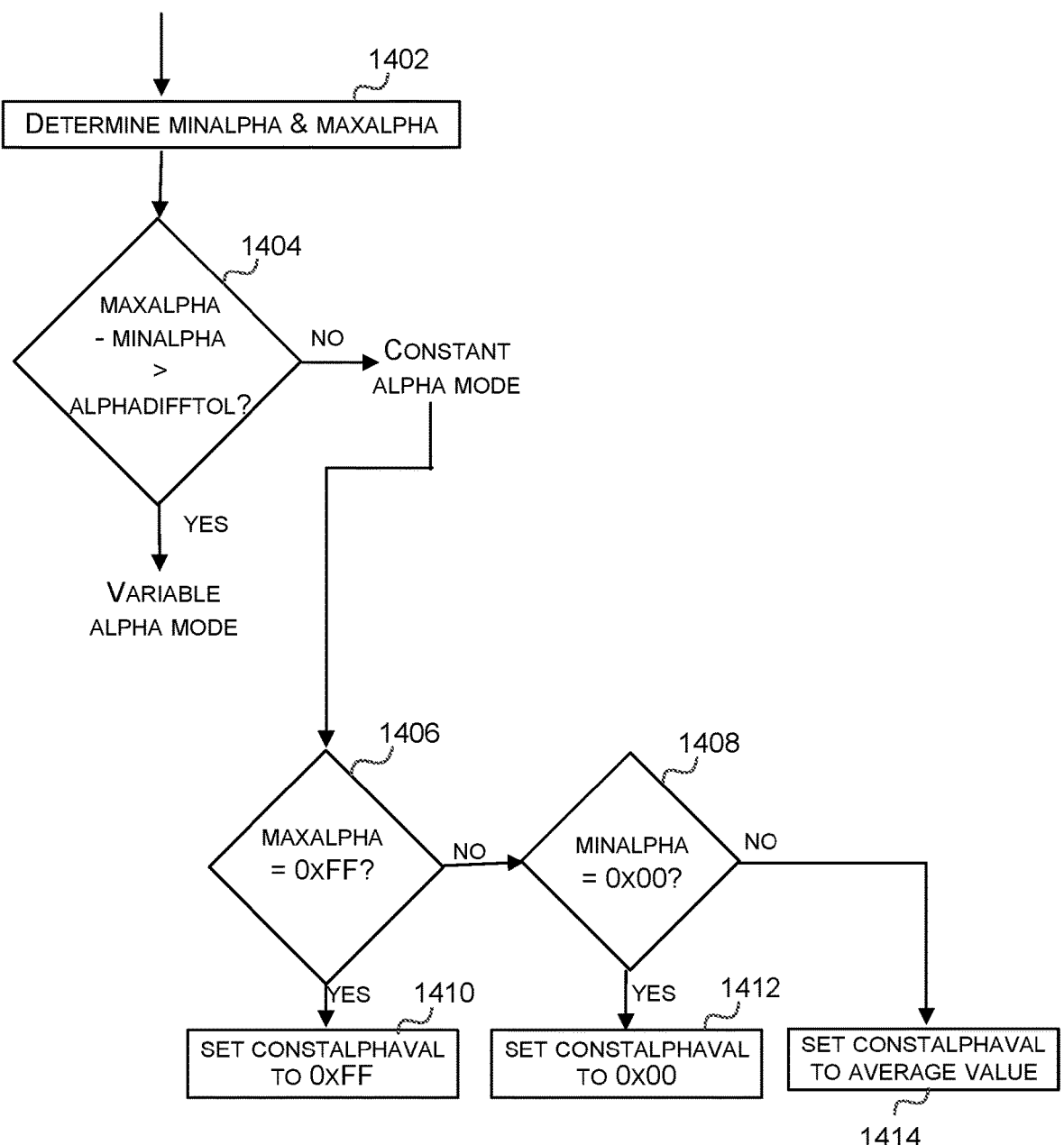
FIGS. 14 and 15 show two different example implementations a method of determining whether to use a constant alpha or a variable alpha mode.
Figure 15:
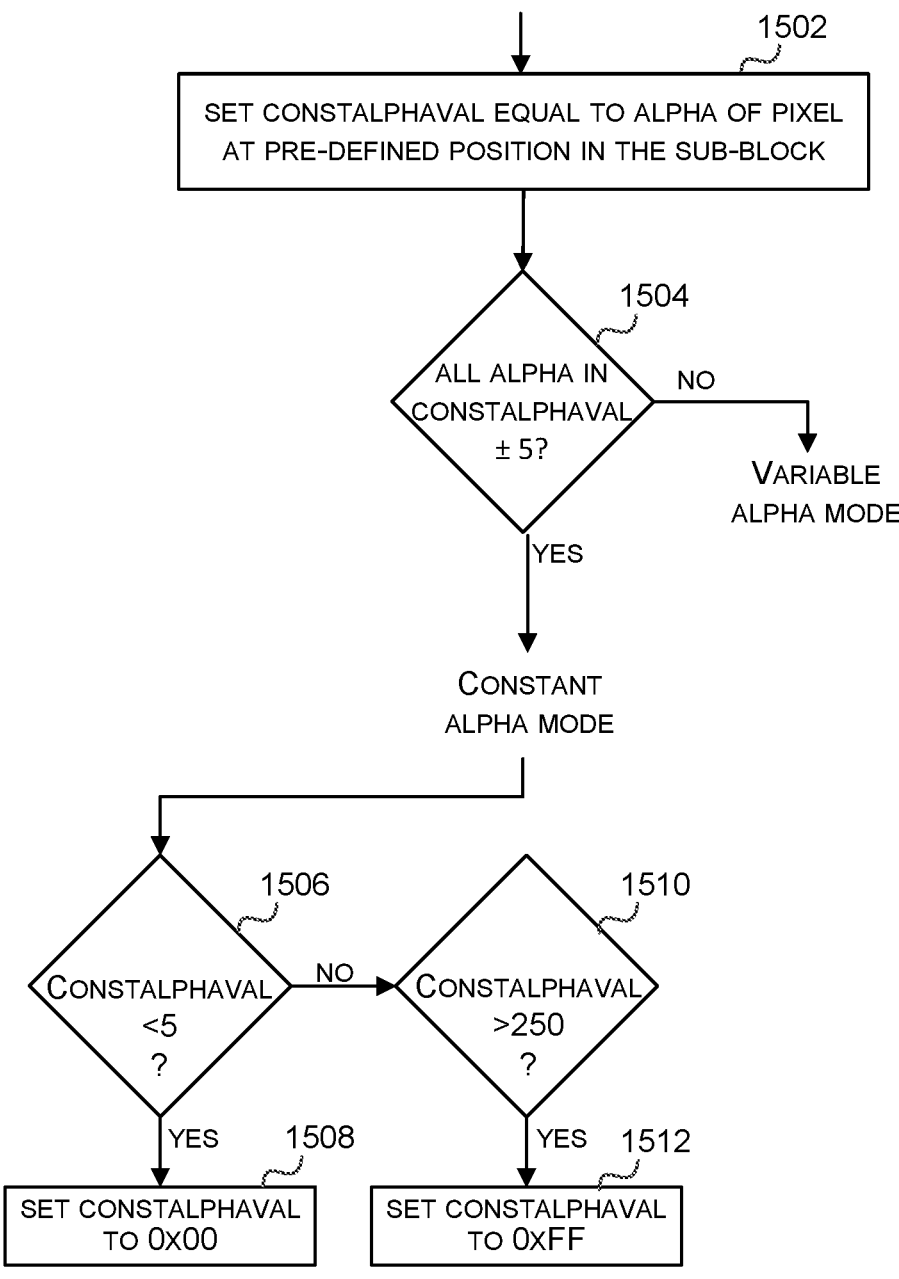

Two example methods of making the determination of whether to use a constant alpha or a variable alpha (in block 1302) are shown in FIGS. 14 and 15 and described below.

In the first example method, as shown in FIG. 14, the alpha values for each of the pixels within the sub-block are analysed and two parameters are computed: minalpha and maxalpha, which are the minimum and maximum values of alpha for all of the pixels in the sub-block (block 1402). These may be determined in any way including, for example, use of a loop (as in the example pseudo-code below, or its functional equivalent) or use of a tree of tests, with the first step determining maximum and minimum alpha values for pairs of pixels and then the second step determining maximum and minimum alpha values for pairs of outputs from the first step, etc. These two parameters (minalpha and maxalpha) are then used in a subsequent decision process (block 1404) and also, where it is determined that a constant alpha mode should be selected, to determine the value of alpha that should be used for the sub-block (blocks 1406-1408).

The decision about whether to use a constant or variable alpha comprises assessing the range of alpha values across the sub-block against a threshold value, alphadifftol (block 1404). This test determines whether the range is greater than the errors that would be introduced by the use of the (best case) variable alpha mode (e.g. as a consequence of the additional compression that would be applied to the pixel data to achieve the same compression ratio) and the size of these errors is denoted alphadifftol and may be predetermined. The value of alphadifftol may be determined by comparing the loss in quality caused by the different methods within the variable alpha mode (i.e. 4-colour encoding with 4 bits of alpha or 3-colour encoding with 5 bits of alpha, and with two pixels sharing the same colour) in a training process (hence the use of the phrase 'best case' above). Alternatively, the value of alphadifftol may be determined (again in a training process) by assessing different candidate values against a large test set of images to find the candidate value that provides the best results using either a visual comparison or an image difference metric. The value of alphadifftol may be fixed or may be programmable.

In response to determining that the range is greater than the errors that would be introduced by the use of the (best case) variable alpha mode ('Yes' in block 1404), a variable alpha mode of compression is applied to this sub-block. However, in response to determining that the range is not greater than the errors that would be introduced by the use of the (best case) variable alpha mode ('No' in block 1404), a constant alpha mode of compression is applied to this sub-block. In this latter case, two further decision operations (blocks 1406, 1408) may be used to determine the value of alpha which is used for the entire sub-block. If the value of maxalpha is the maximum possible value for alpha (e.g. 0xFF, 'Yes' in block 1406), then the value of alpha used in the constant alpha mode (constalphaval) is set to that maximum possible value (block 1410). This ensures that if there are any fully opaque pixels, they stay fully opaque after the data has been compressed and subsequently decompressed. If the value of minalpha is zero (e.g. 0x00, 'Yes' in block 1408), then the value of alpha used in the constant alpha mode (constalphaval) is set to zero (block 1412). This ensures that if there are any fully transparent pixels, they stay fully transparent after the data has been compressed and subsequently decompressed. If neither of these conditions are held ('No' in both blocks 1406 and 1408), then an average value of alpha is calculated across the pixels in the sub-block (block 1414) and used in the constant alpha mode.

The following pseudo-code (or its functional equivalent) may, for example, be used to implement the analysis shown in FIG. 14 and in this code, P.alp is the alpha value for the pixel P being considered:

```
CONST Alphadifftol = 4;
U8 Minalpha := 0xFF;
U8 Maxalpha := 0x00;
U12 AlphaSum := 0;
FOREACH Pixel, P, in the 4x4block
    Minalpha := MIN(P.alp, Minalpha);
    Maxalpha := MAX(P.alp, Maxalpha);
    AlphaSum += P.alp;
ENDFOR
IF((Maxalpha – Minalpha) > Alphadifftol) THEN
    Mode := VariableAlphaMode;
ELSEIF (Maxalpha == 0xFF)
    Mode := ConstAlphaMode;
    Constalphaval := 0xFF;
ELSEIF (Minalpha == 0x00)
    Mode := ConstAlphaMode;
    Constalphaval := 0x00;
ELSE
    Mode := ConstAlphaMode;
    Constalphaval := (AlphaSum + 8) >> 4;
ENDIF
```

It will be appreciated that whilst the decision process is shown in FIG. 14 as being applied in a particular order, in other examples the same tests may be applied in a different order (e.g. blocks 1406 and 1408 may be swapped over, assuming alphadifftol<254). Furthermore, it will be appreciated that the test in block 1404 may alternatively be maxalpha>(minalpha+alphadifftol).

An alternative example implementation of the analysis stage (block 1302) is shown in FIG. 15. In this example, the parameter constalphaval is set initially to the alpha value of a pixel at a pre-defined location within the sub-block (block 1502). For example, constalphaval may be set to the alpha value of the pixel at the top left of the sub-block (i.e. the first pixel in the sub-block). All the alpha values of the other pixels in the sub-block are then compared to this constalphaval (in block 1504). Where all the alpha values are very similar to constalphaval (e.g. within a range of ±5, 'Yes' in block 1504) then the constant alpha mode is used, but where they vary more than this ('No' in block 1504) then the variable alpha mode is used. Then, in a similar manner to the method of FIG. 14, for the constant alpha mode, the parameter constalphaval is calculated. In FIG. 15, this comprises setting it to zero (in block 1508) or the maximum value (in block 1512) where the pixels are all nearly fully transparent (constalphaval<5, 'Yes' in block 1506) or nearly fully opaque (constalphaval>250, 'Yes' in block 1510) respectively. It will be appreciated that the particular values used in FIG. 15 as part of the analysis (e.g. in blocks 1504, 1506 and 1510) are provided by way of example only and in other examples these values may differ slightly.

In comparison to the method of FIG. 14, the method of FIG. 15 does not require the determination of minalpha and maxalpha which reduces the computational effort required to perform the analysis. However, the method of FIG. 15 may produce some visible artefacts (e.g. aliasing) particularly when an object moves slowly across the screen and is less likely to detect a 'constant alpha' tile because of the use of a pre-defined location as the centre of the alpha values.

Irrespective of how the constant alpha value is calculated (by the analysis pipeline 402), this value is then written to the buffer 404 so that it can be subsequently included within the control data block 704 that is added (e.g. appended or prepended) by the tile packing hardware 410 (in block 206C).

Having determined whether to use constant or variable alpha (in block 1302), the method of compressing the sub-block data continues as shown in FIG. 13. The pixel data is analysed on for each sub-block or mini-block to select an encoding pattern (block 204A) and this may be implemented as described above with reference to FIG. 8 with the only differences that the colour differences and average pixel data that are calculated (in blocks 802 and 808) do not include any consideration of the alpha channel and that the average pixel data is determined at a higher resolution, e.g. RGB676 format instead of RGBA5555. Where a two colour mode is also used, the average pixel data is determined at a higher resolution as well compared to the variable alpha equivalent, e.g. RGB888 format instead of RGBA8787.

Having selected one of the pre-defined encoding modes (in block 204A, e.g. as shown in FIG. 8), the encoding operation (in block 204B) will depend upon the selected mode, the input data format and in various examples, upon other factors as well, such as the compression ratio that is required. Compared to the example for RGBA8888 or ARGB8888 format data and variable alpha that is shown in FIG. 10, there are only small variations where a constant alpha mode is used instead of a variable alpha mode and these are described below for RGB888 data and are also set out in the table below, table 4 (which sets out for each encoding mode and for each input pixel, what the encoded pixel data comprises and also includes the two colour mode which is not shown in FIG. 10).

As shown in table 4 below, where a four colour mode is selected, the pixel data is converted from RGB888 to RGB554 format in a variation of block 1004 and where a three colour mode is selected and the pixel data is converted, the pixel data is converted from RGB888 to RGB676 format in variation of block 1012.

TABLE 4

|  | Input pixel A | Input pixel B | Input pixel C | Input pixel D |
|---|---|---|---|---|
| Top 902 | Average of input pixels A and B, read from buffer | Input pixel C data, read from buffer and converted from 888 format to 676 format | No encoded pixel data output | Input pixel data converted from 888 format to 676 format |
| Bottom 904 | Input pixel data converted from 888 format to 676 format | Input pixel data converted from 888 format to 676 format | Average of input pixels C and D, read from buffer | No encoded pixel data output |

TABLE 4-continued

| | Input pixel A | Input pixel B | Input pixel C | Input pixel D |
|---|---|---|---|---|
| Left 906 | Average of input pixels A and C, read from buffer | Input pixel data converted from 888 format to 676 format | No encoded pixel data output | Input pixel data converted from 888 format to 676 format |
| Right 908 | Input pixel data converted from 888 format to 676 format | Average of input pixels B and D, read from buffer | Input pixel data converted from 888 format to 676 format | No encoded pixel data output |
| Diag1 910 | Average of input pixels A and D, read from buffer | Input pixel data converted from 888 format to 676 format | Input pixel data converted from 888 format to 676 format | No encoded pixel data output |
| Diag2 912 | Input pixel data converted from 888 format to 676 format | Average of input pixels B and C, read from buffer | No encoded pixel data output | Input pixel data converted from 888 format to 676 format |
| Four colour mode 914 | Input pixel data converted: Red: 8 to 5 bits Green: 8 to 5 bits Blue: 8 to 4 bits | | | |
| Two colour mode | Average of input pixels A and B, read from buffer | No encoded pixel data output | Average of input pixels C and D, read from buffer | No encoded pixel data output |

Where a constant alpha mode is used, the manner in which data is packed into the data structure (in block 206) may differ from where a variable alpha mode is used and the nature of the control data 704 that is added, e.g. appended or prepended, (in block 206C) may also be different. As shown in FIG. 7, in various examples, the control data 740 for a sub-block 706-712 may comprise a field 722 that identifies the alpha mode (as described above), the constant alpha value, constalphaval, for the sub-block 724 and a set of fields 726 (e.g. four 1-bit fields) that indicates, for each of the mini-blocks in the sub-block, whether either two or four colour mode has been selected. This in turn provides an indication of the number of bits per row of a mini-block. In various examples, this field may comprise a one if two or four colour mode has been used and a zero if three colour mode has been used. In examples where the encoding values as provided above and shown in table 3 are used, this bit value may be determined as follows:

EV[2] AND NOT EV[1]

where the three bits of the encoding value are denoted EV[2], EV[1] and EV[0], where EV[2] is the MSB and EV[0] is the LSB.

The example of the control data 740 may be used for RGB888 and RGB8888 format data where there is a constant alpha. In contrast, for RGB888 and RGB8888 format data with a variable alpha and for RGBA1010102 and ARGB2101010 format data irrespective of whether alpha is constant or variable, the example of the control data 730 (described earlier) may be used.

As described above, to further increase the efficiency of the compression/decompression unit 112, the compressed pixel data for a pixel or pair of pixels (i.e. a pair of adjacent pixels from the same row and same sub-block/mini-block) may be arranged to always be a multiple of P bits (where P is an integer e.g. P=10). Where a constant alpha mode is used, the method of FIG. 10 does not compress each pixel or pair of pixels into a multiple of P bits. In the four colour mode each compressed pixel comprises 14 bits, in the three colour mode each compressed pixel comprises 19 bits and in the two colour mode each compressed pixel comprises 24 bits. To increase efficiency, one or more control bits and in some cases padding bits may be embedded within the pixel data (in block 206A) such that the compressed data for a pixel or pair of pixels is a multiple of P bits.

In an example, where P=10, one control/padding bit is added to each compressed pixel such that in the four colour mode, the total for a pair of compressed pixel is 30 bits and in the three colour mode, each compressed pixel comprises 20 bits. By adding one control/padding bit to each pixel, the total number of bits per pixel in the two colour mode is increased from 24 to 25 and so five further bits (e.g. one control bit and four padding bits or five padding bits) are added such that each compressed pixel comprises 30 bits.

As well as increasing the efficiency, by ensuring that each pixel or pair of pixels is a multiple of P bits, the control bits that are embedded also assist in the decompression operation. The control bits that are added may be the encoding value, EV, bits, with two bits of the encoding value embedded in the pixel data each even row (row 0, row 2, ... ) and the remaining bit of the encoding value embedded in the pixel data in the subsequent odd row (row 1, row 3, ... ) as shown in table 5 below.

TABLE 5

| | | Embedded bits | |
|---|---|---|---|
| Encoding mode | Encoding Value | Even row | Odd row |
| Four colour | 101 | EV[1], EV[0] | EV[2], 1 padding bit |
| Three colour | 000, 010, 110, 001, 011, 111 | EV[1], EV[0] | EV[2] |
| Two colour | 100 | EV[1], EV[0] 4 padding bits | EV[2] 5 padding bits |

By embedding these encoding value bits, they may be used by the unpacking hardware 502 when decompressing the data, in combination with the one bit field in the control data, to distinguish between encoding modes (in block 604), as shown in table 6 below.

TABLE 6

| Bit in control data | Control bits embedded in even row | Encoding mode |
|---|---|---|
| 1 | 01 | Four colour |
| 1 | 00 | Two colour |
| 0 | 00 | Top |
| 0 | 01 | Bottom |
| 0 | 10 | Left or Diag1 |
| 0 | 11 | Right or Diag2 |

Whilst in two scenarios, it is not possible to distinguish between two different three colour encoding modes from the bits in the control data in combination with the control bits embedded in an even row, this does not affect the decompression operation because for both Left and Diag1 modes (embedded bits=10), the even rows are decompressed in the same way (e.g. compressed pixel A corresponds to an average which is used for both decompressed pixel A and one of the pixels in the odd row, and compressed pixel B corresponds to decompressed pixel B) and similarly for both Right and Diag2 modes (embedded bits=11), the even rows are decompressed in the same way (e.g. compressed pixel A corresponds to decompressed pixel A and compressed pixel B corresponds to an average which is used for both decompressed pixel B and one of the pixels in the odd row). The decompression operation uses the control bit embedded in the odd row (EV[2]) to distinguish between Left and Diag1 and between Right and Diag2 modes when decompressing pixels in the odd row.

The following table (table 7) shows an example of the positions at which the control bits may be embedded for the various packing modes and for even and odd rows. As shown in the table below, the position of the embedded control bits for two and four colour modes are the same. This is to aid in the decompression operation since the bit in the control block 704 identifies only that either two or four colour mode has been used and the first embedded control bit, EV[0], identifies which of the two modes has been used (i.e. if EV[0] is one, then four colour mode was used to compress the pixel data and if EV[0] is zero, then two colour mode was used).

substantially in raster scan order and not in mini-block order. For an 8×8 tile 302 the pixel data is packed as follows, using the notation [SB, MB, R] where SB identifies the sub-block where SB=[0, 1, 2, 3], MB identifies the mini-block where MB=[P, Q, R, S] and R identifies the row where R=[E,O], E=even, O=odd:

[0, P, E], [0, Q, E], [1, P, E], [1, Q, E],
[0, P, O], [0, Q, O], [1, P, O], [1, Q, O],
[0, R, E], [0, S, E], [1, R, E], [1, S, E],
[0, R, O], [0, S, O], [1, R, O], [1, S, O],
[2, P, E], [2, Q, E], [3, P, E], [3, Q, E],
[2, P, O], [2, Q, O], [3, P, O], [3, Q, O],
[2, R, E], [2, S, E], [3, R, E], [3, S, E],
[2, R, O], [2, S, O], [3, R, O], [3, S, O].

Similarly, for a 16×8 tile 304 the pixel data is packed as follows:

[0, P, E], [0, Q, E], [1, P, E], [1, Q, E], [2, P, E], [2, Q, E], [3, P, E], [3, Q, E],
[0, P, O], [0, Q, O], [1, P, O], [1, Q, O], [2, P, O], [2, Q, O], [3, P, O], [3, Q, O],
[0, R, E], [0, S, E], [1, R, E], [1, S, E], [2, R, E], [2, S, E], [3, R, E], [3, S, E],
[0, R, O], [0, S, O], [1, R, O], [1, S, O], [2, R, O], [2, S, O], [3, R, O], [3, S, O].

Where the input data is in RGBA1010102 format or ARGB2101010 and a constant alpha mode is used, the same methods may be used as for RGBA8888 or ARGB8888 format data, but prior implementing the methods of FIGS. 8 and 10, a pre-processing step (as described above) may be used that converts the source data into 888 format data plus a flag bit respectively. Additionally, there is a change to the averaging function: as described above, prior to averaging, the 8-bit values are converted up to 9-bit values if the flag is set (to re-align values depending upon the HDR value). No other changes are required to the compression methods described above for RGBA8888 or ARGB8888 format data.

In various examples, in order to compress each pixel or pair of pixels into a multiple of P bits where P=10 for RGBA1010102 format or ARGB2101010 format data and where a constant alpha mode is used, the encoding and/or packing operation may include the addition of one or more

TABLE 7

| Encoding mode | Row | Compressed bits per mini-block row | Packed format (per mini-block row) - MSB on left, LSB on right |
|---|---|---|---|
| Two colour | Even | 30 bits (1 pixel) | EV[1], 0000, r[7:0], g[7:6], EV[0], g[5:0], b[7:0] |
| | Odd | | 00000, r[7:0], g[7:6], EV[2], g[5:0], b[7:0] |
| Three colour | Even | 40 bits (2 pixels) | EV[1], r1[5:0], g1[6:0], b1[5:0], EV[0], r0[5:0], g0[6:0], b0[5:0] |
| | Odd | 20 bits (1 pixel) | EV[2], r[5:0], g[6:0], b[5:0] |
| Four colour | Even | 30 bits (2 pixels) | EV[1], r1[4:0], g1[4:0], b1[3:0], EV[0], r0[4:0], g0[4:0], b0[3:0] |
| | Odd | | 0, r1[4:0], g1[4:0], b1[3:0], EV[2], r0[4:0], g0[4:0], b0[3:0] |

Table 7 also illustrates how the bit that is included in the control data block 704 that identifies when two/four colour modes are used also identifies the number of compressed bits that correspond to one row of pixels (in block 602). In this example, for two/four colour modes, each mini-block row comprises 30 bits and for three colour modes, an even row comprises 50 bits and an odd row comprises 20 bits.

Whilst table 7 above shows how compressed pixel data for a mini-block is packed into the pixel data block (in block 206), as detailed above, the compressed pixel data is packed padding bits. In the four colour mode, each pair of compressed pixels comprises 30 bits and no padding bits are required. In the three colour mode, each compressed pixel comprises 20 bits and again no padding pits are required; however, in the two colour mode, each compressed pixel comprises 25 bits and so five padding bits (e.g. 00000) are added such that each compressed pixel comprises 30 bits.

In all the examples above, P=10. In other examples, different values of P may be used by changing the bit depths used (e.g. in FIG. 10) and/or adding different numbers of padding bits. Similarly, the methods described above may be applied to other formats of RGBA/RGB/ARGB data by modifying the bit depths used.

The examples described above all relate to RGBA or ARGB data. In the event that the input data is RGB data (i.e. there is no alpha channel), then the constant alpha modes described above may be used (omitting the decision point in block 1302) and without calculating or storing a constant alpha value.

In the above description, various compression methods are described and in order to decompress the data, the inverse of the methods described above are used (e.g. in pressed pixel values per mini-block, whereas the odd rows may comprise one or two compressed pixel values per mini-block. This means that when performing decompression, the pixel data in an even row always comprises all the pixel data required to output two decompressed output pixels in that row and may also comprise some advance data for use in decompressing the pair of pixels in the subsequent row of the same mini-pixel. This advance data may be stored within the decoding hardware 506. There is no situation where the decompression in raster scan order cannot occur because the data required for decompression is stored later in the stream.

TABLE 8

|  | Output pixel A | Output pixel B | Output pixel C | Output pixel D |
|---|---|---|---|---|
| Top 902 | Even row left (LSB) decompressed value | Even row left (LSB) decompressed value | Even row right (MSB) decompressed value | Odd row decompressed value |
| Bottom 904 | Even row left (LSB) decompressed value | Even row right (MSB) decompressed value | Odd row decompressed value | Odd row decompressed value |
| Left 906 | Even row left (LSB) decompressed value | Even row right (MSB) decompressed value | Even row left (LSB) decompressed value | Odd row decompressed value |
| Right 908 | Even row left (LSB) decompressed value | Even row right (MSB) decompressed value | Odd row decompressed value | Even row right (MSB) decompressed value |
| Diag1 910 | Even row left (LSB) decompressed value | Even row right (MSB) decompressed value | Odd row decompressed value | Even row left (LSB) decompressed value |
| Diag2 912 | Even row left (LSB) decompressed value | Even row right (MSB) decompressed value | Even row right (MSB) decompressed value | Odd row decompressed value |
| Four colour mode 914 | Even row left (LSB) decompressed value | Even row right (MSB) decompressed value | Odd row left (LSB) decompressed value | Odd row right (MSB) decompressed value |
| Two colour mode | Even row decompressed value | Even row decompressed value | Odd row decompressed value | Odd row decompressed value | block 606, having identified the relevant encoding mode in block 604). Referring back to tables 1, 2 and 4 which show implementations of FIG. 10 and variations thereof, for four colour mode 914, the decompression comprises converting the reduced bit depth data for each of the four colours back to the required format and any suitable method may be used. For two colour mode, one average encoded pixel colour is received and this pixel colour is used for two adjacent pixels and again the data format may then be converted. For three colour mode, for each pair of pixels, two encoded pixel values are received in an even row and one encoded pixel value is received in an odd row and dependent upon the particular encoding mode, these pixel colours are assigned differently to the decompressed pixels and again the data format may then be converted.

Figure 16:
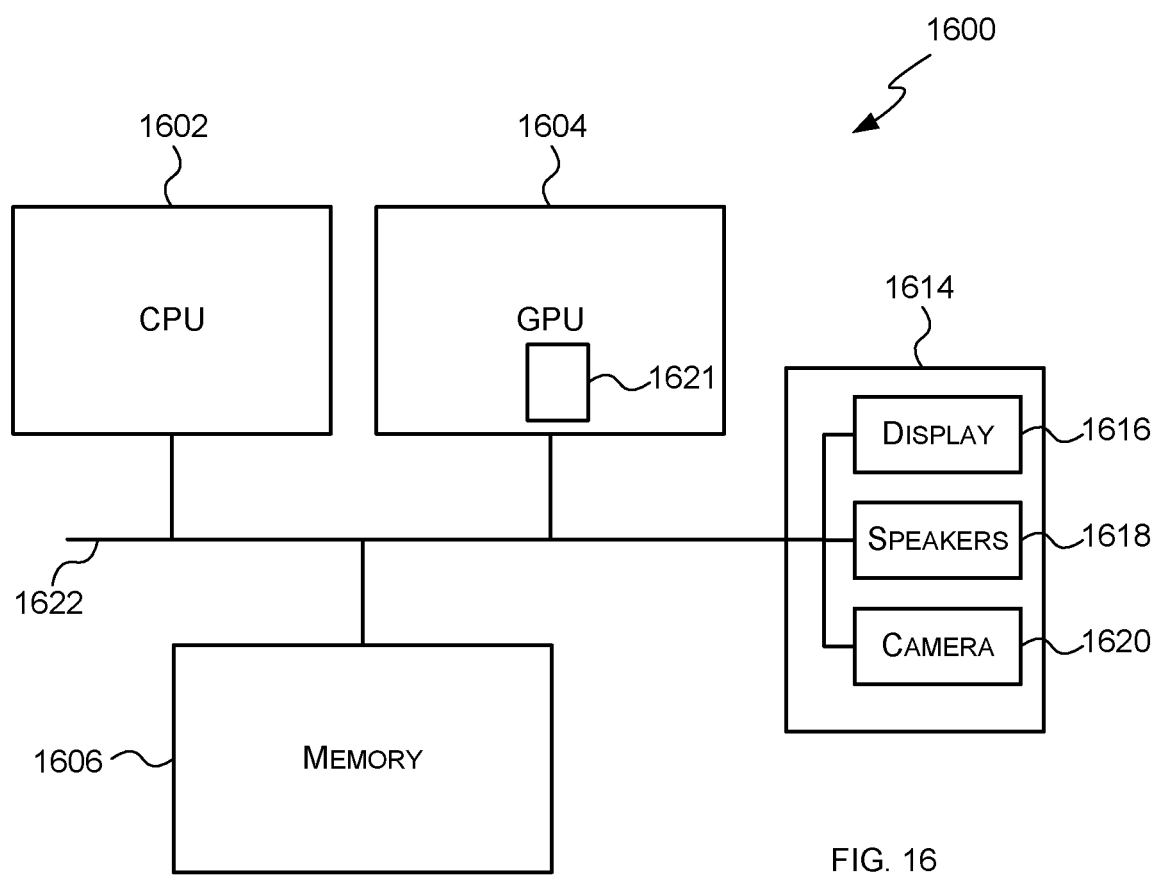
FIG. 16 shows a computer system in which a data compression and/or decompression unit is implemented.

Table 8 below shows which decompressed pixel values are used for each of the decompressed output pixels A, B, C and D in a mini-block. As with previous tables, whilst this is shown on a per mini-block basis, the pixels are decompressed and output in raster scan order, such that in an even row, pixels A and B are decompressed and output and in an odd row, pixels C and D are decompressed and output. As detailed above, the even rows always comprise two com- FIG. 16 shows a computer system in which the data compression and decompression methods and apparatus described herein may be implemented. The computer system comprises a CPU 1602, a GPU 1604, a memory 1606 and other devices 1614, such as a display 1616, speakers 1618 and a camera 1620. A data compression and/or decompression block 1621 (which may implement any of the methods described herein) is implemented on the GPU 1604. In other examples, the data compression and/or decompression block 1621 may be implemented on the CPU 1602. The components of the computer system can communicate with each other via a communications bus 1622.

The data compression hardware of FIGS. 4 and 5 are shown as comprising a number of functional blocks. This is schematic only and is not intended to define a strict division between different logic elements of such entities. Each functional block may be provided in any suitable manner. It is to be understood that intermediate values described herein as being formed by data compression hardware need not be physically generated by the data compression hardware at any point and may merely represent logical values which conveniently describe the processing performed by the data compression hardware between its input and output.

The data compression and decompression hardware described herein (including any hardware that is arranged to implement any of the methods described above) may be embodied in hardware on an integrated circuit. The data compression and decompression hardware described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture data compression and/or decompression hardware configured to perform any of the methods described herein, or to manufacture data compression and/or decompression hardware comprising any apparatus described herein. An integrated circuit definition dataset may be, for example, an integrated circuit description.

Therefore, there may be provided a method of manufacturing, at an integrated circuit manufacturing system, data compression and/or decompression hardware as described herein. Furthermore, there may be provided an integrated circuit definition dataset that, when processed in an integrated circuit manufacturing system, causes the method of manufacturing data compression and/or decompression hardware to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture data compression and/or decompression hardware will now be described with respect to FIG. 17.

Figure 17:
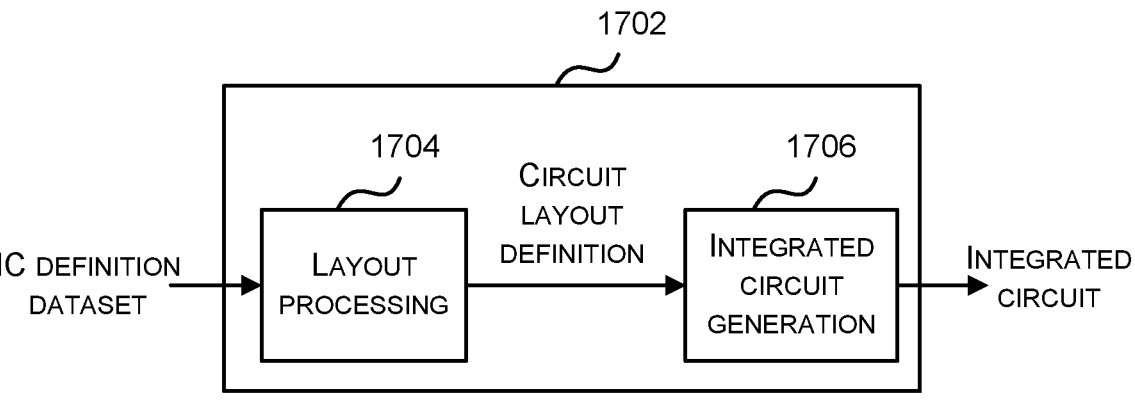
FIG. 17 shows an integrated circuit manufacturing system for generating an integrated circuit embodying a data compression and/or decompression unit as described herein.

FIG. 17 shows an example of an integrated circuit (IC) manufacturing system 1702 which is configured to manufacture data compression and/or decompression hardware as described in any of the examples herein. In particular, the IC manufacturing system 1702 comprises a layout processing system 1704 and an integrated circuit generation system 1706. The IC manufacturing system 1702 is configured to receive an IC definition dataset (e.g. defining data compression and/or decompression hardware as described in any of the examples herein), process the IC definition dataset, and generate an IC according to the IC definition dataset (e.g. which embodies data compression and/or decompression hardware as described in any of the examples herein). The processing of the IC definition dataset configures the IC manufacturing system 1702 to manufacture an integrated circuit embodying data compression and/or decompression hardware as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture data compression and/or decompression hardware without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 17 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 17, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of data compression comprising:
  receiving input pixel data for a block of data in raster scan order, the pixel data comprises at least first, second and third channel data for each pixel;
  compressing the pixel data substantially in raster scan order using a block-based encoding scheme; and
  outputting compressed pixel data substantially in raster scan order;
  wherein the first, second and third channel data for each pixel comprises red, green and blue channel data for each channel.

2. The method according to claim 1, wherein compressing the pixel data substantially in raster scan order using a block-based encoding scheme comprises:
  sub-dividing the input block of pixels into part-blocks, each part-block comprising more than one row of pixels; and
  compressing the pixel data substantially in raster scan order using a block-based encoding scheme and the sub-division.

3. The method according to claim 2, wherein compressing the pixel data substantially in raster scan order using a block-based encoding scheme and the sub-division comprises:
  for each part-block, analysing pixel data for pixels in the part-block to identify an encoding pattern for use on the pixels in the part-block; and
  encoding the pixel data substantially in raster scan order using the selected patterns.

4. The method according to claim 3, wherein a part-block comprises 2×2 pixels and wherein analysing pixel data to identify an encoding pattern for use on pixels in the part-block comprises, for each part-block:
  calculating differences for each pixel pair in the part-block;
  in response to determining that a smallest difference does not exceed a pre-defined threshold, selecting one of a set of three-value encoding patterns based on the pixel pair having the smallest difference and calculating and storing in a buffer average pixel data for the pixels in the pixel pair having the smallest difference; and in response to determining that the smallest difference does exceed a pre-defined threshold, selecting a four-value encoding mode.

5. The method according to claim 4, wherein analysing pixel data to identify an encoding pattern for use on pixels in the part-block further comprises, for each part-block:

in response to determining that the smallest difference does not exceed a pre-defined threshold and that the pixel pair having the smallest difference is the pair of pixels in a first row of the part-block, storing in the buffer pixel data for a first pixel in a second row of the part-block.

6. The method according to claim 3, wherein encoding the pixel data substantially in raster scan order using the selected patterns comprises:

encoding the pixel data substantially in raster scan order using the selected patterns such that each pixel or pair of adjacent pixels from the same part-block is compressed into a sequence of a multiple of P bits, where P is an integer.

7. The method according to claim 6, wherein encoding the pixel data substantially in raster scan order using the selected patterns such that each pixel or pair of adjacent pixels from the same part-block is compressed into a sequence of a multiple of P bits comprises:

encoding the pixel data substantially in raster scan order using the selected patterns; and where a pixel or pair of adjacent pixels from the same part-block is compressed into a sequence that is less than a multiple of P bits, embedding one or more control and/or padding bits to increase the sequence length to a multiple of P bits.

8. The method according to claim 7, wherein a part-block comprises 2×2 pixels and wherein encoding the pixel data substantially in raster scan order using the selected patterns comprises:

for a pair of adjacent pixels from a first row in a part-block and where a three-value encoding pattern is used, outputting a sequence comprising two encoded pixel values; and for a pair of adjacent pixels from a second row in a part-block and where a three-value encoding pattern is used, outputting a sequence comprising one encoded pixel value.

9. The method according to claim 8, wherein:

the sequence comprising two encoded pixel values comprises either:

average pixel data for a pixel pair in the part-block read from a buffer and converted pixel data for one of the pair of adjacent pixels from the first row of the part-block; or converted pixel data for each of the pair of adjacent pixels from the first row of the part-block; and the sequence comprising one encoded pixel value comprises either:

average pixel data for a pixel pair in the part-block read from a buffer; or converted pixel data for one of the pair of adjacent pixels from the second row of the part-block.

10. The method according to claim 1, wherein outputting compressed pixel data substantially in raster scan order comprises:

packing the compressed pixel data into a data structure substantially in raster scan order; and outputting the data structure.

11. The method according to claim 10, wherein packing the compressed pixel data into a data structure substantially in raster scan order comprises:

concatenating the compressed pixel data substantially in raster scan order to form a block of compressed pixel data; and concatenating the block of compressed pixel data and a block of control data.

12. The method according to claim 11, wherein concatenating the block of compressed pixel data and a block of control data comprises:

appending or prepending the block of control data to the block of compressed pixel data.

13. The method according to claim 11, further comprising, prior to concatenating the compressed pixel data:

embedding one or more bits of control data within the pixel data.

14. A non-transitory computer readable storage medium having stored thereon computer readable code configured to cause the method as set forth in claim 1 to be performed when the code is run.

15. Data compression hardware comprising:

an input for receiving input pixel data for a block of data in raster scan order, the pixel data comprises at least first, second and third channel data for each pixel;

hardware logic arranged to compress the pixel data substantially in raster scan order using a block-based encoding scheme; and an output for outputting compressed pixel data substantially in raster scan order;

wherein the first, second and third channel data for each pixel comprises red, green and blue channel data for each channel.

16. The data compression hardware according to claim 15, wherein the hardware logic comprises:

an analysis pipeline arranged to sub-divide the input block of pixels into part-blocks, each part-block comprising more than one row of pixels; and encoding hardware arranged to compress the pixel data substantially in raster scan order using a block-based encoding scheme and the sub-division.

17. The data compression hardware according to claim 16, further comprising a buffer, wherein the analysis pipeline is further arranged to store data in the buffer for use by the encoding hardware and wherein the encoding hardware is arranged to read the stored data from the buffer when encoding the pixel data.

18. A non-transitory computer readable storage medium having stored thereon a computer readable dataset description of an integrated circuit that, when processed in an integrated circuit manufacturing system, causes the integrated circuit manufacturing system to manufacture data compression hardware as set forth in claim 15.

19. An integrated circuit manufacturing system comprising:

a non-transitory computer readable storage medium having stored thereon a computer readable dataset description of an integrated circuit that describes data compression hardware as set forth in claim 15;

a layout processing system configured to process the integrated circuit dataset description so as to generate a circuit layout description of an integrated circuit embodying the data compression hardware; and an integrated circuit generation system configured to manufacture the data compression hardware according to the circuit layout description.

* * * * *